(12) United States Patent
Hong et al.

(10) Patent No.: US 10,798,692 B2
(45) Date of Patent: Oct. 6, 2020

(54) METHOD AND DEVICE FOR PROVIDING CONTROL INFORMATION FOR DIFFERENT SERVICES

(71) Applicant: Samsung Electronics Co., Ltd., Gyeonggi-do (KR)

(72) Inventors: Sungnam Hong, Suwon-si (KR); Taeyoung Kim, Seoul (KR); Hyunseok Ryu, Yongin-si (KR); Yeohun Yun, Hwaseong-si (KR); Namjeong Lee, Suwon-si (KR); Jongbu Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 148 days.

(21) Appl. No.: 15/617,990

(22) Filed: Jun. 8, 2017

(65) Prior Publication Data

US 2017/0359807 A1 Dec. 14, 2017

(30) Foreign Application Priority Data

Jun. 8, 2016 (KR) ........................ 10-2016-0071260

(51) Int. Cl.
*H04W 72/04* (2009.01)
*H04L 5/00* (2006.01)
*H04L 27/34* (2006.01)
*H04W 72/12* (2009.01)
*H04W 52/32* (2009.01)

(52) U.S. Cl.
CPC ......... *H04W 72/042* (2013.01); *H04L 5/0037* (2013.01); *H04L 27/3488* (2013.01); *H04W 52/325* (2013.01); *H04W 72/0446* (2013.01); *H04W 72/1289* (2013.01); *H04W 72/048* (2013.01)

(58) Field of Classification Search
None
See application file for complete search history.

(56) References Cited

U.S. PATENT DOCUMENTS

2014/0086160 A1   3/2014   Kim et al.
2015/0180622 A1   6/2015   Yoo et al.
(Continued)

FOREIGN PATENT DOCUMENTS

WO   WO-2017177083 A1 * 10/2017   .............. H04J 11/00

OTHER PUBLICATIONS

International Search Report for International Application No. PCT/KR2017/005960, dated Sep. 20, 2017. (3 pages).
(Continued)

*Primary Examiner* — Yaotang Wang

(57) ABSTRACT

The present disclosure relates to a 5G or pre-5G communication system to be provided to support a higher data transmission rate since 4G communication systems like LTE. The present disclosure relates to a method for providing control information for different services of a base station. A method of a first terminal includes: receiving control information; identifying a control channel for the first terminal based on the control information; and decoding information received in the control channel for the first terminal based on superposition transmission related information included in the control information.

20 Claims, 17 Drawing Sheets

(56) References Cited

U.S. PATENT DOCUMENTS

| | | | |
|---|---|---|---|
| 2015/0256308 A1 | 9/2015 | Ma et al. | |
| 2015/0280871 A1 | 10/2015 | Xu et al. | |
| 2017/0295592 A1* | 10/2017 | Yang | H04L 1/00 |
| 2019/0190645 A1* | 6/2019 | Sano | H04L 1/0069 |
| 2019/0268903 A1* | 8/2019 | Lee | H04L 1/18 |

OTHER PUBLICATIONS

ZTE Corporation et al., "Discussion on Control Channel Design for NR MIMO", 3GPP TSG RAN WG1 Meeting #85, R1-165038, Nanjing, China, May 23-27, 2016. (4 pages).

Nokia et al., "Punctured Scheduling for Low Latency Transmissions", 3GPP TSG-RAN WG1 #85, R1-165381, Nanjing, P.R. China, May 23-27, 2016. (4 pages).

KT Corp et al., "Discussion on NR numerology", 3GPP TSG RAN WG1 Meeting #85, R1-165525, Nanjing, China, May 23-27, 2016. (5 pages).

* cited by examiner

METHOD AND DEVICE FOR PROVIDING CONTROL INFORMATION FOR DIFFERENT SERVICES

CROSS-REFERENCE TO RELATED APPLICATION(S) AND CLAIM OF PRIORITY

The present application is related to and claims priority under 35 U.S.C. § 119(a) to Korean Patent Applications Serial Number 10-2016-0071260 filed on Jun. 8, 2016 the contents of which are incorporated herein by reference.

TECHNICAL FIELD

Various embodiments of the present disclosure relate to a mobile communication system, and more particularly, to a method and a device for providing control information for different services in a mobile communication system.

BACKGROUND

To meet a demand for radio data traffic that is on an increasing trend since commercialization of a 4G communication system, efforts to develop an improved 5G communication system or a pre-5G communication system have been conducted. For this reason, the 5G communication system or the pre-5G communication system is called a communication system beyond 4G network or a system since the post LTE.

To achieve a high data transmission rate, the 5G communication system is considered to be implemented in a super high frequency (mmWave) band (e.g., like 60 GHz band). To alleviate a path loss of a radio wave and increase a transfer distance of the radio wave in the super high frequency band, in the 5G communication system, beamforming, massive MIMO, full dimensional MIMO (FD-MIMO), array antenna, analog beam-forming, and large scale antenna technologies have been discussed.

Further, to improve a network of the system, in the 5G communication system, technologies such as evolved small cell, advanced small cell, cloud radio access network (RAN), ultra-dense network, device to device communication (D2D), wireless backhaul, moving network, cooperative communication, coordinated multi-points (CoMP), and received interference cancellation have been developed.

In addition, in the 5G system, hybrid FSK and QAM modulation (FQAM) and sliding window superposition coding (SWSC) that are an advanced coding modulation (ACM) scheme and a filter bank multi carrier (FBMC), a non orthogonal multiple access (NOMA), and a sparse code multiple access (SCMA) that are an advanced access technology, and so on have been developed.

Meanwhile, the 5G communication system has considered a support for various services compared to the existing 4G system. For example, the most representative services are an enhanced mobile broadband (eMBB) communication service, an ultra-reliable and low latency communication (URLLC) service, a massive machine type communication (mMTC) service, an evolved multimedia broadcast/multicast service (eMBMS), etc.

Unlike the existing 4G system, the URLLC service is a service that is newly considered in the 5G system and need to satisfy high reliability (packet error rate of 10-5) and low latency (0.5 msec) conditions, compared to other services. For example, the URLLC service may be used for services such as self-driving, e-health, and drone. Hereinafter, a system that provides the URLLC service may be referred to as a URLLC system.

Also, since the URLLC service requires a low delay such as user plane latency of 1 ms, and therefore a short transmission time interval (TTI) of 0.1 ms shorter than the eMBB service may be used. Of course, the TTI structure may be changed. For example, the TTI structure may be changed depending on a frame structure, a hybrid ARQ round trip time (RTT), and so on, and the TTI may be 0.2 ms in case of a self-contained frame structure.

In addition, the URLLC service requires a broadband transmission compared to a packet size due to low latency as well as stringent reliability conditions. For example, if 100 to 1000 bits per packet are transmitted, to satisfy end-to-end latency of 1 ms and a packet error rate (PER) of about 10-9 as in the case of factory automation, a bandwidth corresponding to 8 MHz per packet of 1000 bits is required even under 16-level diversity. Increasing the bandwidth may decrease a transmission packet drop rate for strict latency, and therefore the URLLC system capacity may be increased upon the broadband transmission. For example, when 40 terminals request user-plane latency (U-plane latency) of 1 ms and reliability of 10-4 when each terminal transmits 1 Mbps, if a bandwidth is increased twice from 10 MHz to 20 MHz, the system capacity may be increased three times or more.

However, if a dedicated resource is used to provide the URLLC service, the required bandwidth is increased, the limited frequency may not be efficiently used, and the eMBB service may experience severe performance deterioration. Accordingly, the base station may superpose and transmit data for the eMBB service (hereinafter, referred to as eMBB data) and data for the URLLC service (hereinafter, referred to as URLLC data) via the same resource.

However, the control information for the URLLC service (hereinafter, referred to as the URLLC control information) requires much higher reliability than the control information for the eMBB service (hereinafter, eMBB control information), and if the URLLC control information and the eMBB data or the eMBB control information are transmitted while being superposed with each other, a problem may arise in the reliability of the URLLC control information. Likewise, if the URLLC data or the URLLC control information is transmitted while being superposed with each other in the section in which the eMBB control information is transmitted, the control information for the eMBB service may be damaged. Therefore, there is a need for an operation method for an eMBB/URLLC service capable of improving the reliability of the control information for the URLLC service and the eMBB service.

SUMMARY

Accordingly, embodiments of the present disclosure are directed to the provision of a method and device for providing control information for each service so that high reliability may be maintained even when a URLLC service and an eMBB service superposes and uses resources.

Objects of the present disclosure are not limited to the above-mentioned objects. That is, other objects that are not mentioned may be obviously understood by those skilled in the art to which the present disclosure pertains from the following description.

Accordingly, embodiments of the present disclosure are directed to the provision of a method of a first terminal comprising: receiving control information; identifying a control channel for the first terminal based on the control information; and decoding information received in the control channel for the first terminal based on superposition transmission related information included in the control information.

Accordingly, embodiments of the present disclosure are directed to the provision of a method of a base station comprising: identifying control channel related information related to a location of a control channel of a first terminal and a location of a control channel of a second terminal; determining superposition transmission related information for the first terminal and the second terminal; generating control information including the superposition transmission related information and the control channel related information; and transmitting the control information.

Accordingly, embodiments of the present disclosure are directed to the provision of a first terminal comprising: a transceiver transmitting and receiving a signal to and from other network entities; and a controller receiving control information, identifying a control channel for the first terminal based on the control information, and decoding information received in the control channel for the first terminal based on superposition transmission related information included in the control information.

Accordingly, embodiments of the present disclosure are directed to the provision of a base station comprising: a transceiver transmitting and receiving a signal to and from other network entities; and a controller identifying control channel related information related to a location of a control channel for a first terminal and a location of a control channel for a second terminal, determining superposition transmission related information for the first terminal and the second terminal, generating control information including the superposition transmission related information and the control channel related information, and transmitting the control information.

According to the present disclosure, it is possible to maintain the high reliability and to provide the control information for each service even when the URLLC service and the eMBB service are provided by superposing resources.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
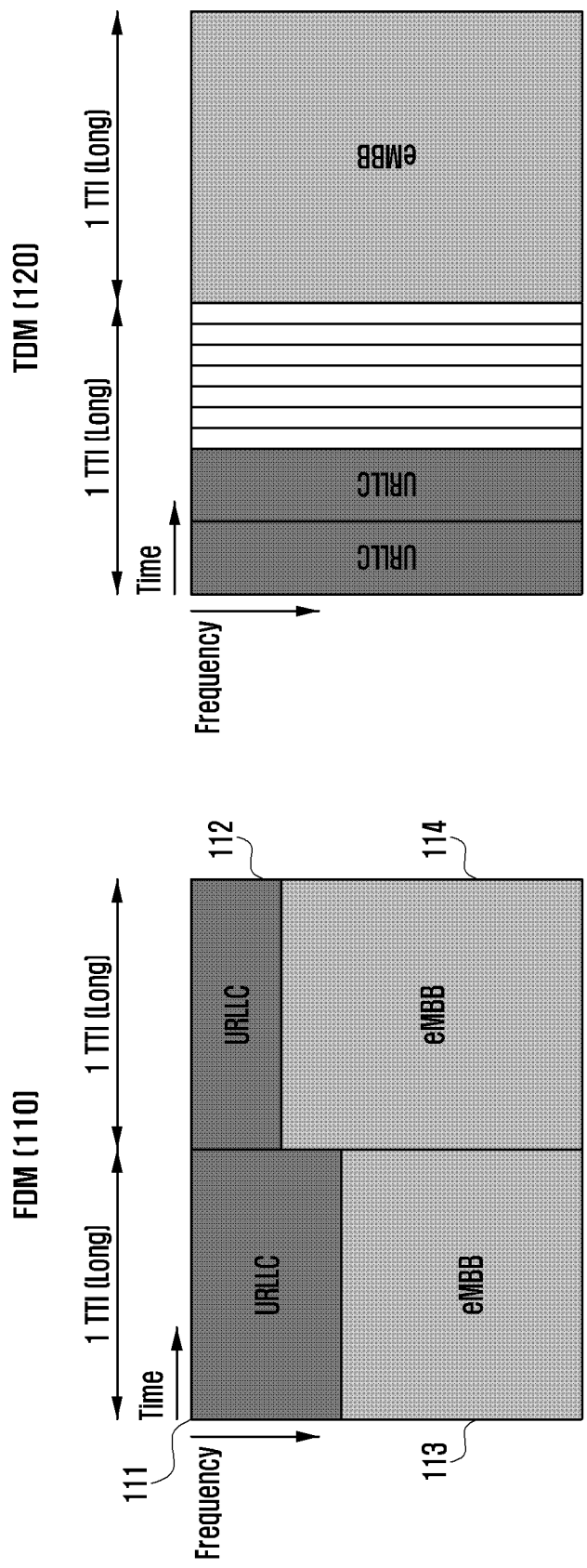
FIG. 1A is a diagram illustrating a method for providing an eMBB service and a URLLC service according to the present disclosure.

FIGS. 1A through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the present disclosure will be described in detail with reference to the accompanying drawings.

In describing the embodiments of the present disclosure, a description of technical contents which are well known to the art to which the present disclosure belongs and are not directly connected with the present disclosure will be omitted. This is to more clearly transfer a gist of the present disclosure by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

In describing the exemplary embodiments of the present disclosure in the present specification, a description of technical contents which are well known to the art to which the present disclosure belongs and are not directly connected with the present disclosure will be omitted. This is to more clearly transfer a gist of the present disclosure by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate some of modules, segments, or codes including one or more executable instructions for executing a specific logical function(s). Further, it is to be noted that functions mentioned in the blocks occur regardless of a sequence in some alternative embodiments. For example, two blocks that are consecutively illustrated may be simultaneously performed in fact or be performed in a reverse sequence depending on corresponding functions sometimes.

Here, the term '~unit' used in the present embodiment means software or hardware components such as FPGA and ASIC and the '~unit' performs any roles. However, the meaning of the '~unit' is not limited to software or hardware. The '~unit' may be configured to be in a memory medium that may be addressed and may also be configured to reproduce one or more processor. Accordingly, for example, the '~unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the '~units' may be combined with a smaller number of components and the '~units' or may further separated into additional components and '~units'. In addition, the components and the '~units' may also be implemented to reproduce one or more CPUs within a device or a security multimedia card.

FIG. 1A is a diagram illustrating a method for providing an eMBB service and a URLLC service according to the present disclosure.

According to the present disclosure, a system using a first TTI may be referred to as a first system and a system using a second TTI may be referred to as a second system. In addition, a service provided by the first system may be referred to as a first service and a service provided by the second system may be referred to as a second service. The first service and the second service may each include any one of an eMBB service and a URLLC service. According to the present disclosure, for convenience of explanation, the case where the eMBB service is a first service and the URLLC service is a second service will be described by way of example, but the scope of the present disclosure is not limited thereto. That is, the first service may be the URLLC service and the second service may be the eMBB service. The first service and the second service may include either an MTC service or an eMBMS service.

If the base station uses a dedicated resource to provide the URLLC service, a required bandwidth for providing a URLLC service is increased. Therefore, in order to efficiently use a frequency, a method for providing a URLLC service using a resource coexisting (or superposed) with a resource assigned to provide the eMBB service is needed. According to the present disclosure, for convenience of explanation, the example in which the a resource for providing an eMBB services and a resource for providing a URLLC service coexist is described, but the scope of the present disclosure is not limited thereto. For example, a method for providing a URLLC service using resources coexisting with resources for providing an MBB service, resources for providing an LTE service or the like may be included.

Since a first TTI (e.g., normal TTI) is used for the eMBB service and a second TTI (e.g., short TTI) is used for the URLLC service, a method for superposing multiple TTIs to superpose and use resources for providing a URLLC service and resources for providing an eMBB service may be used. Here, the TTI may mean a time unit for assigning a resource and a hybrid ARQ round trip time (RTT), a scheduling request, etc. may be defined as an integer multiple of a TTI.

The unit of time of the TTI in which at least two systems are operated may be different. Alternatively, the unit of time of the TTI may be the same. A base station may setup more than two operations to provide at least two services to a terminal. Accordingly, the terminal may be operated as one system or operated as more than two systems, and the base station may setup whether the terminal operates as one system or two or more systems according to the situation.

For example, the base station may provide both eMBB service and the URLLC service to one terminal. Alternatively, the base station may provide the eMBB service and the URLLC service to different terminals, respectively. In the present disclosure, for convenience, the case where an eMBB terminal using the eMBB service and a URLLC terminal using the URLLC service are different terminals will be described by way of example.

Meanwhile, a method for multiplexing multiple TTIs may perform the multiplexing by dividing the multiple TTIs into a time base or a frequency base. The multiplexing method may configure a resource region of a first TTI (for example, normal TTI) and a second TTI (for example, short TTI) in a semi-static manner and a method for assigning a resource within the resource region may be used.

Referring to FIG. 1A, an FDM scheme 110 may include a method for configuring a resource region of a first TTI (normal TTI) and a second TTI (short TTI) by dividing a resource region into the frequency base. That is, the FDM scheme 110 may include a method for multiplexing a resource region of a first TTI (normal TTI) and a second TTI (short TTI) by dividing a resource region into the frequency base.

As such, if a resource is divided into the frequency base, frequency bands 111 and 112 that may be used by the URLLC system are limited for the entire frequency band, and the URLLC system may not use frequency bands 113 and 114 used by the eMBB system. Therefore, the FDM scheme is inefficient in terms of increasing the capacity of the URLLC system.

Meanwhile, a TDM scheme 120 may include a method for configuring a resource region of a first TTI (normal TTI) and a second TTI (short TTI) by dividing a resource region into the time base. That is, the TDM scheme 120 may include a method for multiplexing a resource region of a first TTI (normal TTI) and a second TTI (short TTI) by dividing a resource region into the time base.

As such, if the resource is used by being divided into the time base, the RTT is dependent on the first TTI (normal TTI), such that the latency speed due to the second TTI (short TTI) may be reduced. Further, the scheduling of the URLLC service needs to wait until the second TTI (short TTI) section arrives, such that the availability of the URLLC service may be reduced.

In the case of the FDM scheme or the TDM scheme for dividing the resource based on the first TTI (normal TTI), it is difficult to secure available resources due to a change in a resource amount if a time critical service is requested. Therefore, if a terminal operated on the basis of the first TTI (normal TTI) but using the second TTI (short TTI) is connected, a method for interrupting a transmission of data to the terminal receiving a service using the first TTI (normal TTI) to perform puncturing and providing a service to the terminal using the second TTI (short TTI) may be used. In the present disclosure, the puncturing may means an operation of interrupting the transmission of data in the corresponding region and emptying the corresponding resource.

Figure 1B:
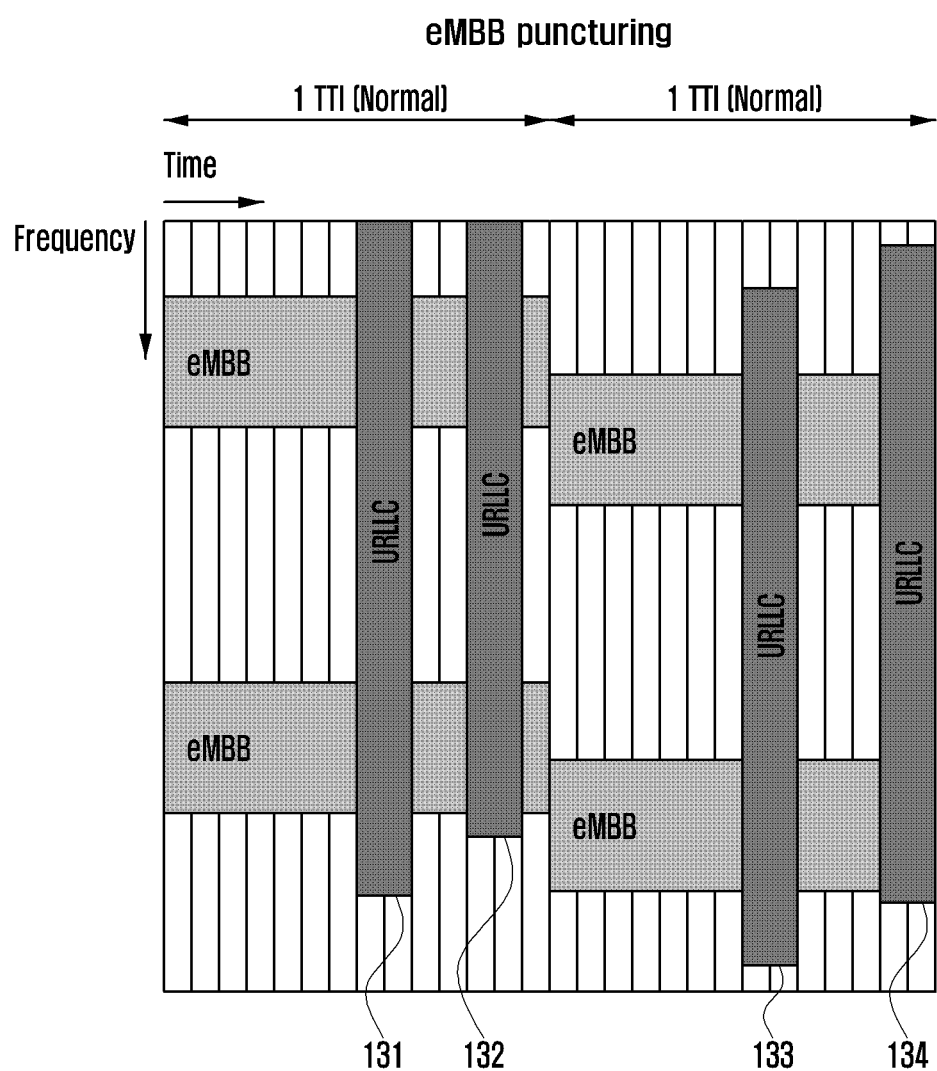
FIG. 1B is a diagram illustrating another method for providing an eMBB service and a URLLC service according to the present disclosure.

FIG. 1B is a diagram illustrating another method for providing an eMBB service and a URLLC service according to the present disclosure.

Referring to FIG. 1B, the base station divides a resource on the basis of the eMBB service using the first TTI (normal TTI), but if the URLLC terminal accesses the base station to receive a URLLC service using a second TTI (short TTI), the base station may interrupt providing the eMBB service to perform the puncturing and provide the URLLC service to the URLLC terminal.

Referring to FIG. 1B, if the URLLC terminal accesses the base station, the base station may preferentially assign a resource to the URLLC terminal 131, 132, 133 and 134. At this time, the resource region that is preferentially assigned to the URLLC terminal may be referred to as a URLLC resource region. A size of a frequency domain in the URLLC resource region may be determined in advance or determined depending on the amount of data for providing the URLLC service. In addition, a portion of the URLLC resource region that superposes a resource assigned to provide the eMBB service may be referred to as a superposition region.

If the URLLC terminal accesses the base station, the base station punctures the data to be transmitted to the eMBB terminal in the superposition region, and may transmit only data for the URLLC terminal.

Meanwhile, if the eMBB terminal does not know the information that the puncturing is performed in the superposition region, it may attempt to decode all the data received by the superposition region and fail to perform the decoding. Therefore, the eMBB terminal should know whether the puncturing is performed, and the detailed content thereof will be described below.

Figure 1C:
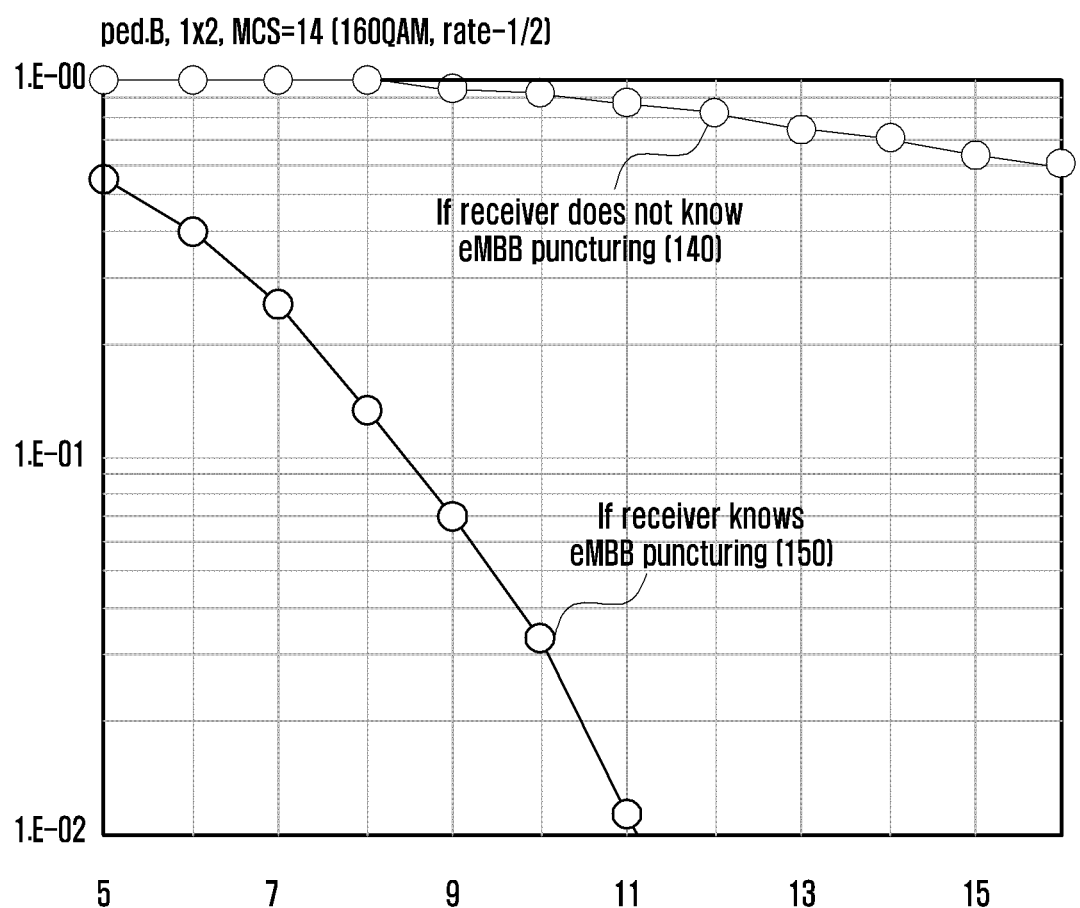
FIG. 1C is a diagram illustrating performance of a terminal according to whether an eMBB terminal knows whether or not puncturing is performed.

FIG. 1C is a diagram illustrating performance of a terminal according to whether an eMBB terminal knows whether or not puncturing is performed.

A graph 140 shows performance information in a case where the eMBB terminal does not know whether the puncturing is performed in a part of the resource region assigned to the eMBB terminal. Referring to the graph 140, if the eMBB terminal does not know whether the puncturing is performed, the eMBB terminal recognizes the URLLC data transmitted in the superposition region as its own data and performs the decoding. Therefore, the eMBB terminal may not decode data transmitted to the eMBB terminal, and it may be identified that a block error rate (BLER) is not substantially reduced as a signal to noise ratio (SNR) increases.

On the other hand, a graph 150 shows a case where the eMBB terminal knows whether the puncturing is performed in a part of a resource region assigned thereto and may identify that a BLER value is reduced as the SNR increases and the eMBB terminal may be decoded compared to the graph 140.

Meanwhile, as described above, if a resource is preferentially assigned to the URLLC terminal, there is an advantage in terms of the URLLC service, but there is a disadvantage in that the performance of the eMBB system deteriorates as the number of URLLC terminals that accesses the base station increases. In order to alleviate the performance deterioration, the base station may use a method for superposing and transmitting an eMBB service and a URLLC service in a part of resources in a superposition region.

Figure 2A:
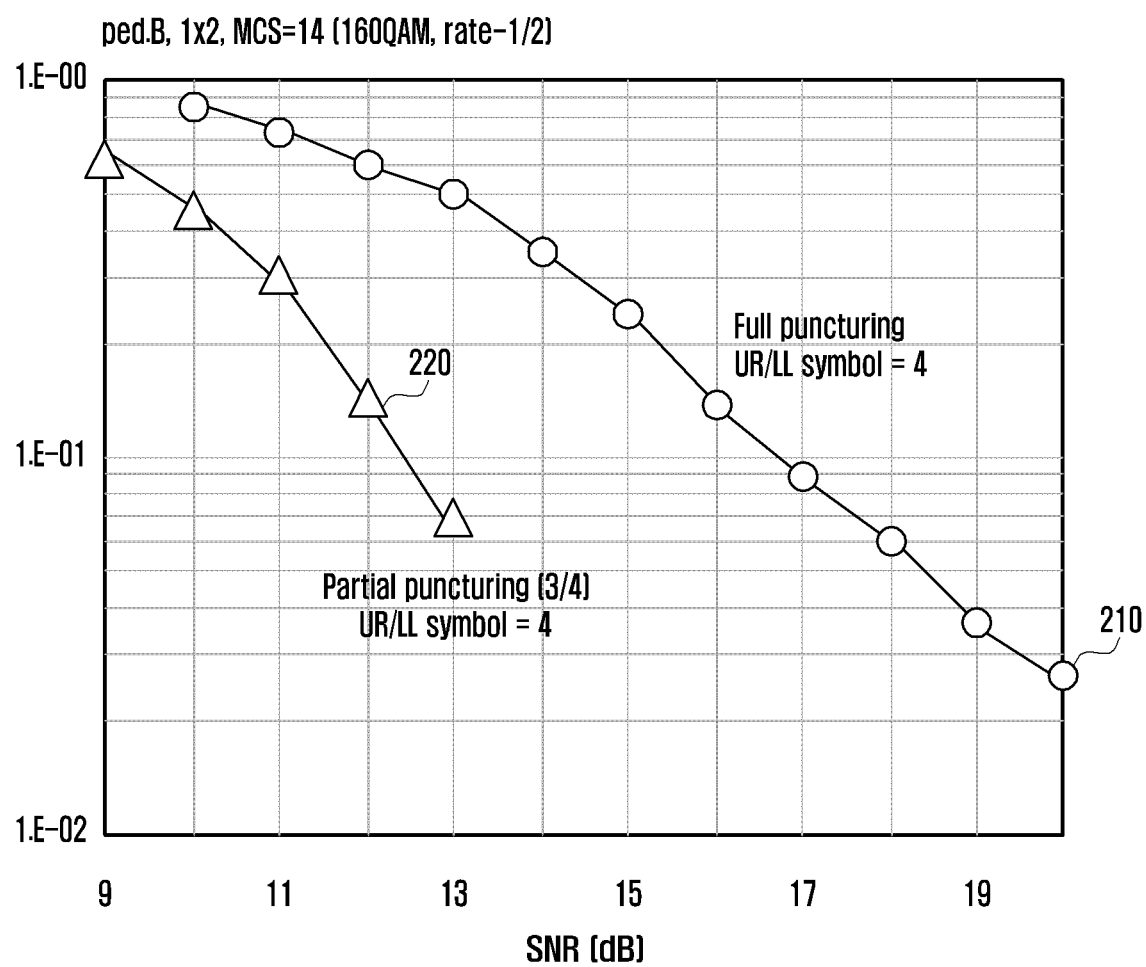
FIG. 2A is a diagram illustrating performance of an eMBB service depending on a superposition transmission according to the present disclosure.

FIG. 2A is a diagram illustrating performance of an eMBB service depending on a superposition transmission according to the present disclosure.

Referring to FIG. 2A, a graph 210 shows the performance of the eMBB service when full puncturing is used, and a graph 220 shows the performance of the eMBB service if the superposition transmission is used. In the present disclosure, the full puncturing may be a method for puncturing all data to be transmitted to an eMBB terminal in a superposition region and transmitting only data for a URLLC terminal. Further, in the present disclosure, the superposition transmission may mean a method for puncturing a part of data to be transmitted to an eMBB terminal in a superposition region and superposing and transmitting the data for a URLLC terminal.

Comparing the graph 210 with the graph 220, it may be identified that an SNR value of the graph 210 is larger than an SNR value of the graph 220 with respect to the same BLER value and performance deterioration may be more alleviated in the case where some of resources are superposed and used than in the case where all resources are punctured.

Further, the URLLC terminal may use the interference suppression reception technique to overcome the influence of interference occurring due to the transmission of data for the eMBB terminal to the same resource.

Figure 2B:
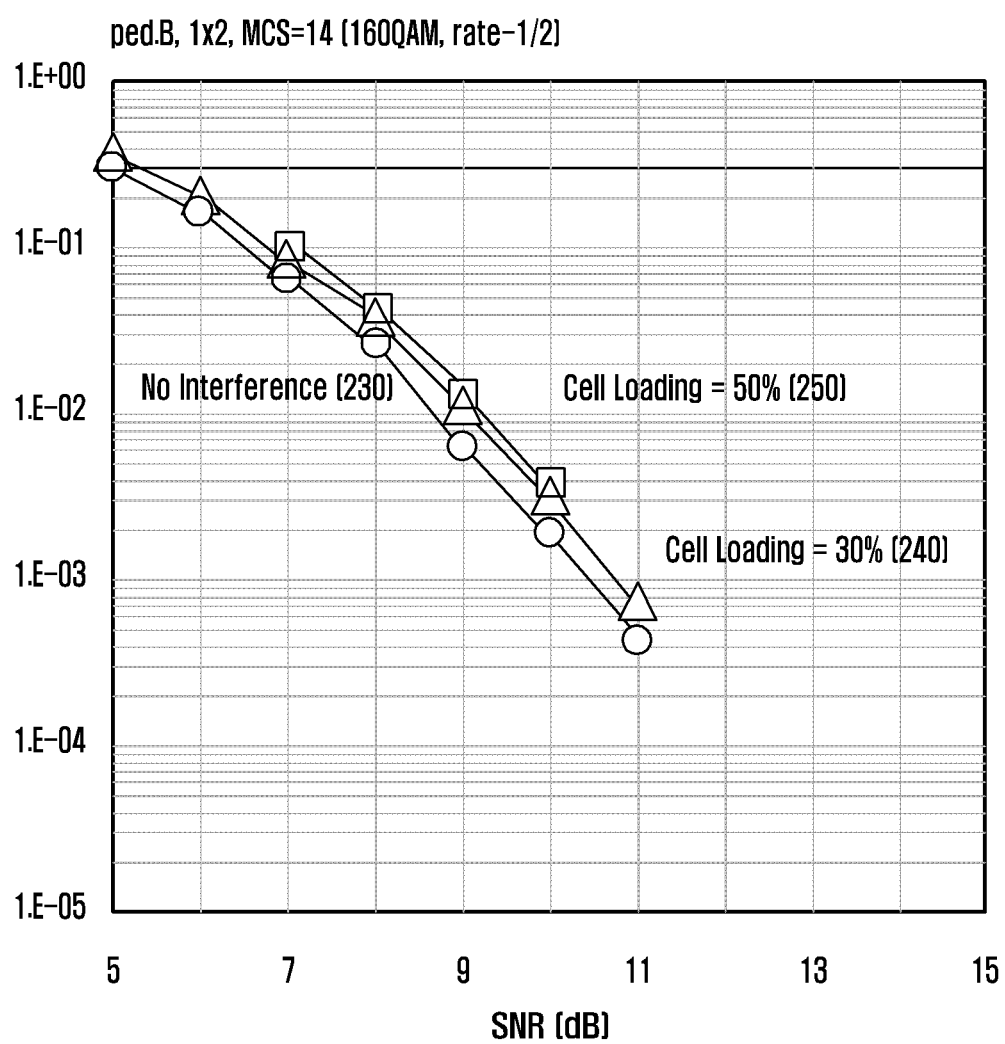
FIG. 2B is a diagram illustrating an influence of interference when the interference suppression reception technique is applied.

FIG. 2B is a diagram illustrating an influence of interference when the interference suppression reception technique is applied.

FIG. 2B shows the relationship between the BLER value and the SNR as the application of the interference suppression technique. Referring to FIG. 2B, it may be identified that the SNR value are similar for the same BLER value when there is no interference (230), when a cell load is 30% (240), and when the cell load is 50% (250). That is, even when the amount of data of the eMBB service transmitted through a collision region is increased, it may be identified that the influence of interference on the URLLC service is constant by using the interference suppression reception technique.

However, in case of the URLLC service, the eMBB control information may be transmitted through the control channel and then scheduled, and the URLLC control information requires much higher reliability than the existing eMBB control information. However, the reliability of the URLLC control information may be reduced when the resource for transmitting the URLLC control information is used while being superposed with the resource for providing the eMBB service.

Further, if the URLLC service is transmitted in a section in which the eMBB control information is transmitted, the reliability of the eMBB control information may also be greatly reduced. Therefore, a method for providing URLLC control information and eMBB control information with high reliability is suggested below.

Figure 3:
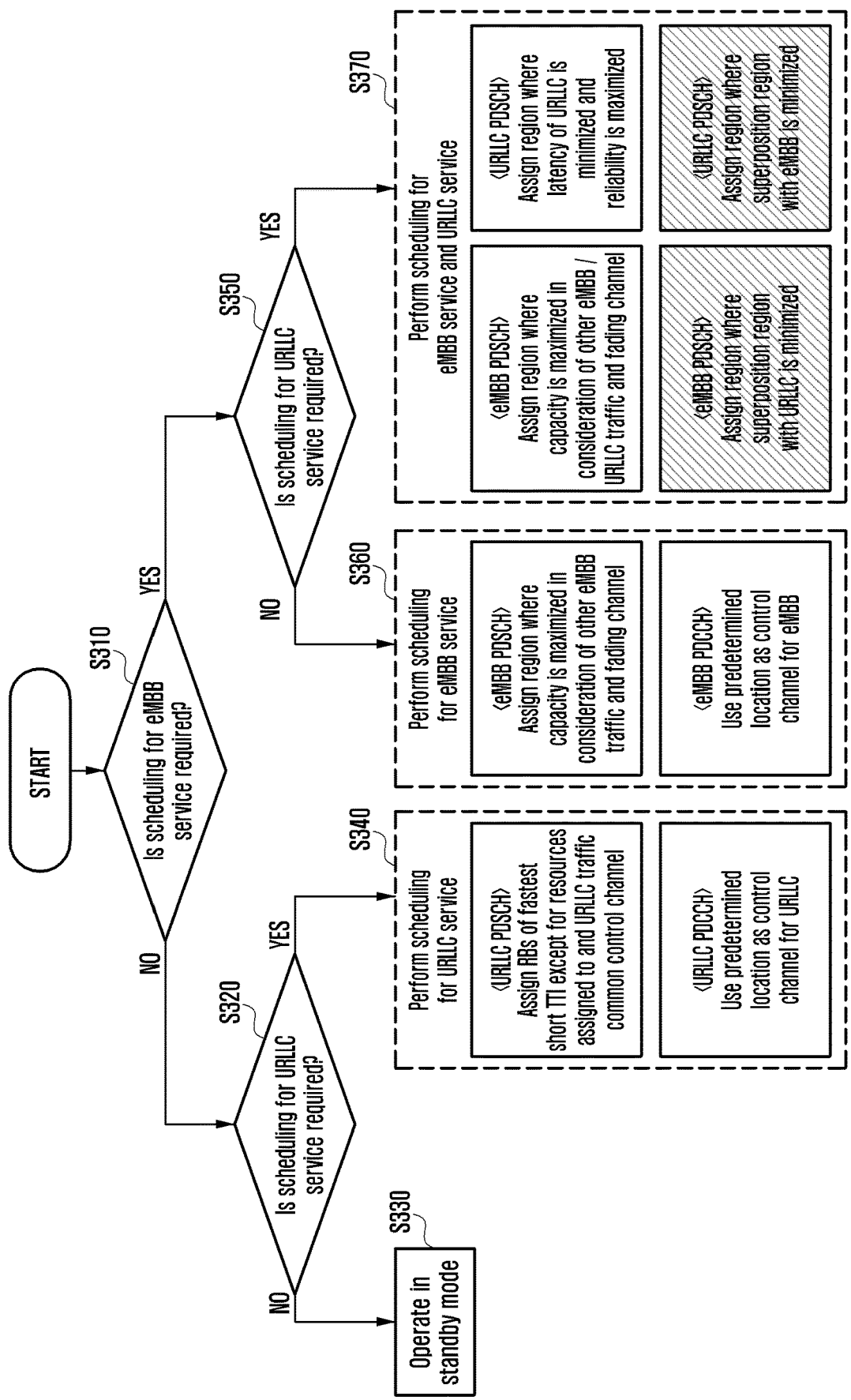
FIG. 3 is a diagram illustrating a method for assigning resources to a terminal according to an embodiment of the present disclosure.

FIG. 3 is a diagram illustrating a method for assigning resources to a terminal according to an embodiment of the present disclosure.

In the present disclosure, a control channel region for providing the eMBB control information may be referred to as an eMBB control channel (or eMBB PDCCH), and a control channel region for providing the URLLC control information may be referred to as a URLLC control channel (or URLLC PDCCH). Likewise, a data channel region for transmitting the eMBB data may be referred to as an eMBB data channel (or eMBB PDSCH), and a data channel region for providing URLLC data may be referred to as a URLLC data channel (or URLLC PDSCH).

Referring to FIG. 3, in step S310, the base station may identify whether the scheduling for the eMBB service is required. The case where the scheduling for the eMBB service is required may mean the case where the eMBB data to be transmitted to the terminal exists.

If the scheduling for the eMBB service is not required, the base station may identify whether the scheduling for the URLLC service is required in step S320. The case where the scheduling for the URLLC service is required may mean the case where the URLLC data to be transmitted to the terminal exists.

If the scheduling for the eMBB service and the scheduling for the URLLC service are not required, the base station may be operated in a standby mode without scheduling the terminal in step S330.

On the other hand, if the scheduling for the URLLC service is required, the base station may schedule the URLLC service for the terminal in step S340.

Specifically, the base station may assign a resource region of a fastest TTI to a terminal except for resources assigned to a physical downlink control channel (PDCCH) region (hereinafter, referred to as a common control channel) and other URLLC services. The base station may provide the URLLC service to the terminal through the region assigned to the terminal, and the region assigned to the terminal may be the URLLC data channel.

Also, the base station may use a predetermined location as a control channel for URLLC and transmit scheduling information for the URLLC service to the URLLC terminal through the control channel. At this time, the predetermined location may include a predetermined location in the common control channel or the physical downlink shared channel (PDSCH) region of a subframe. The scheduling information to be transmitted to the URLLC terminal may include information related to a resource assigned to the URLLC terminal, that is, resource assignment information in the URLLC data channel.

Meanwhile, if the scheduling for the eMBB service is required, in step S350, it may be identified whether the scheduling for the URLLC service is required.

If the scheduling for the eMBB service is required but the scheduling for the URLLC service is not required, in step S360, the base station may schedule the eMBB service for the terminal.

Specifically, the base station may assign a region in which capacity may be maximized, to an eMBB terminal, in consideration of a resource and a fading channel assigned to the common control channel and other eMBB services. The base station may provide the eMBB service to the terminal through the region assigned to the terminal, and the region assigned to the terminal may be the eMBB data channel.

Also, the base station may use a predetermined location as a control channel for eMBB and transmit scheduling information for the eMBB service to the eMBB terminal through the control channel. At this time, the predetermined location may include a predetermined location in the common control channel or the PDSCH region. The scheduling information to be transmitted to the eMBB terminal may include information related to a resource assigned to the eMBB terminal, that is, resource assignment information in the eMBB data channel.

Meanwhile, if both of the scheduling for the eMBB service and the scheduling for the URLLC service are required, in step S370, the base station may schedule the eMBB service and the URLLC service.

Specifically, the base station may assign a region, in which capacity may be maximized, to an eMBB terminal, in consideration of a resource and a fading channel assigned to other eMBB services and URLLC services. The base station may provide the eMBB service to the terminal through the region assigned to the terminal, and the region assigned to the terminal may be the eMBB data channel.

Further, the base station may assign a region, in which a superposition region with the URLLC service is minimized, to an eMBB control channel. That is, the base station may assign a region, in which a region superposed with the region assigned to the URLLC service is minimized, to the eMBB control channel. The base station may transmit the scheduling information for the eMBB service to the eMBB terminal through the eMBB control channel. The scheduling information to be transmitted to the eMBB terminal may include the resource assigned to the eMBB terminal, that is, the resource assignment information in the eMBB data channel.

In addition, the base station may assign the region, in which a latency of the URLLC service may be minimized and reliability may be maximized, to the URLLC terminal. The base station may provide the URLLC service to the terminal through the region assigned to the terminal, and the region assigned to the terminal may be a URLLC data region.

Further, the base station may assign a region, where a superposition region with the eMBB service is minimized, to the URLLC control channel. That is, the base station may assign a region, where a region superposed with the region assigned to the eMBB service is minimized, to the URLLC control channel. The base station may transmit the scheduling information for the URLLC service to the URLLC terminal through the URLLC control channel. The scheduling information to be transmitted to the URLLC terminal may include information related to a resource assigned to the URLLC terminal, that is, resource assignment information in the URLLC data channel.

Figure 4:
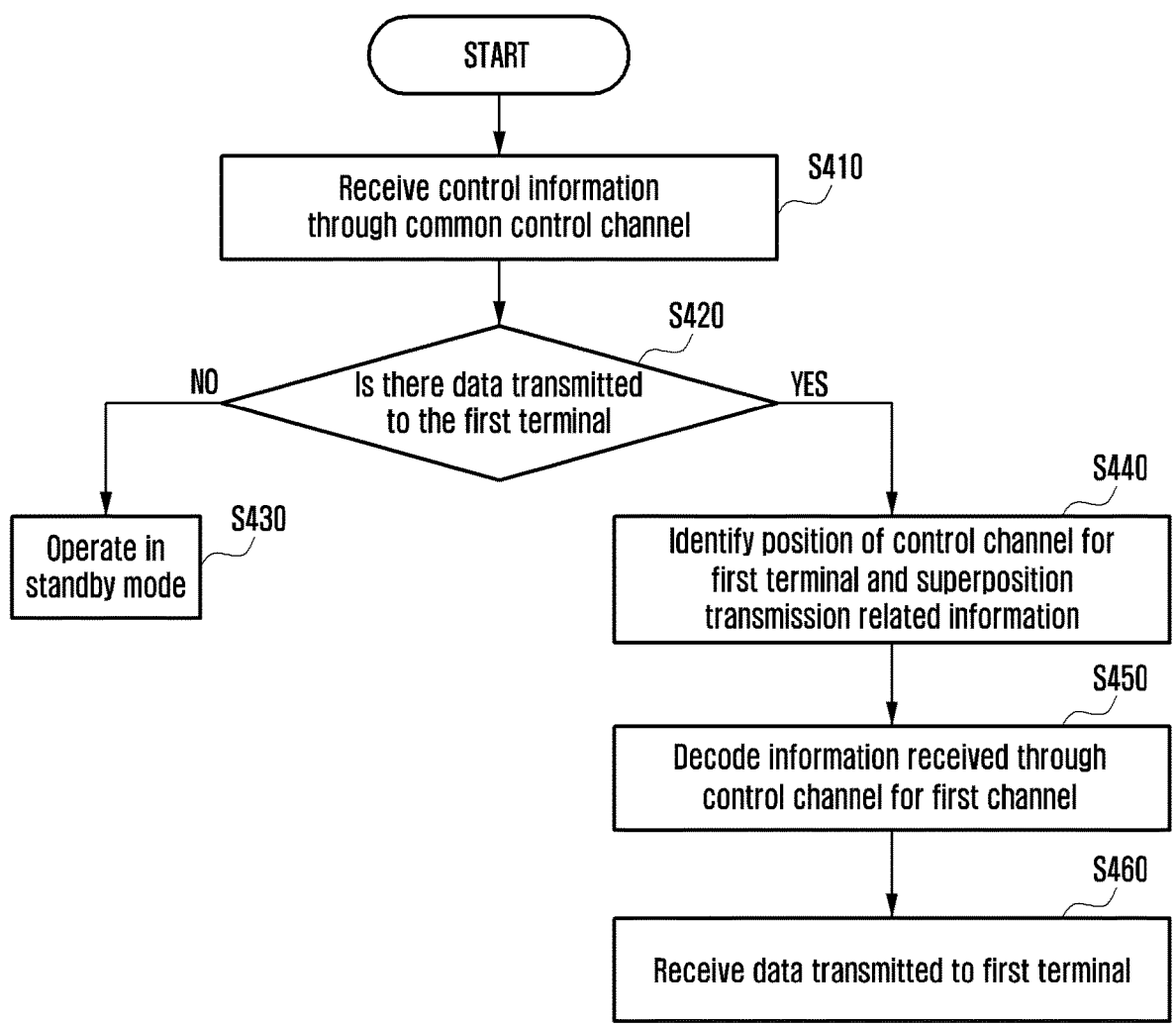
FIG. 4 is a diagram illustrating a process for a terminal to receive data according to the present disclosure.

FIG. 4 is a diagram illustrating a process for a terminal to receive data according to the present disclosure.

As described above, a terminal receiving a first service may be referred to as a first terminal and a terminal receiving a second service may be referred to as a second terminal. The first service may refer to a service using the first TTI and the second service may refer to a service using the second TTI. Further, in the present drawing, the first terminal and the second terminal may mean either the eMBB terminal or the URLLC terminal. However, the scope of the present disclosure is not limited thereto, and the present disclosure may be applied even to an MTC terminal or an eMBMS terminal.

Also, in the present disclosure, the control channel for receiving, by the first terminal, the first service may be referred to as a control channel for the first terminal or a control channel for the first service, and the control channel for receiving, by the second terminal, the second service may be referred to as a control channel for the second terminal or a control channel for the second service.

In step S410, the first terminal may receive the control information through the common control channel. Hereinafter, the control information received through the common control channel may be referred to as common control information. The first terminal receiving the common control information may decode the common control information and identify contents included in the common control information.

Specifically, the common control information may include at least one of control channel candidate information, control channel related information, and superposition transmission related information in the control channel. Further, the control channel candidate information, the control channel related information, and the superposition transmission related information in the control channel may include information for at least one service. The detailed content thereof will be described below.

Further, in step S420, the first terminal may identify whether or not there is data to be transmitted to the first terminal based on the common control information.

If there is no data to be transmitted to the first terminal, in step S430, the first terminal may be operated in the standby mode.

On the other hand, if there is data to be transmitted to the first terminal, in step S440, the first terminal may identify the location of the control channel for the first terminal and the superposition transmission related information in the control channel based on the common control channel. Also, the first terminal may identify the location of the control channel for the second terminal and the superposition transmission related information.

Specifically, the common control information may include the control channel related information that is information related to the location of the control channel that may be assigned to the first terminal. The control channel related information may include the control channel related information of the first terminal and the second terminal. Alternatively, the control channel related information of the first terminal and the control channel related information of the second terminal may exist separately. Accordingly, the first terminal may identify the location of the control channel for the first terminal and the location of the control channel for the second terminal based on the common control information.

In addition, the common control information may include superposition transmission related information (hereinafter, referred to first superposition transmission related information) including information such as a superposition indicator indicating whether or not to perform the superposition transmission with data of the second service in the superposition region in the control channel of the first terminal, an avoidance indicator indicating whether or not to avoid and transmit data for the second service in the control channel region of the first terminal, puncturing information indicating a superposition ratio in the control channel, and superposition power information in the control channel indicating a power ratio of data to another service. Further, the common control information may include a superposition indicator indicating whether or not to perform the superposition transmission with the data of the first service within the control channel of the second terminal and an avoidance indicator indicating whether or not to avoid and transmit the data for the first service in the control channel region of the second terminal.

Specifically, an eMBB superposition indicator may mean information indicating whether or not to puncture the eMBB control information if a collision with the resource assigned for transmitting the URLLC data in the eMBB control channel occurs. Further, a URLLC superposition indicator may mean information indicating whether or not to puncture the eMBB data if a collision with the resource assigned for transmitting the eMBB data in the URLLC control channel occurs. For example, if the eMBB superposition indicator is 1, the eMBB control information and the URLLC data may be superposed and transmitted (partial puncturing) in the superposition region of the eMBB control channel and if the eMBB superposition indicator is 0, the eMBB control information may not be transmitted (full puncturing) in the eMBB superposition region.

Further, if the URLLC superposition indicator is 1, the URLLC control information and the eMBB data may be superposed and transmitted in the superposition region of the URLLC control channel and if the URLLC superposition indicator is 0, the eMBB data may not be transmitted in the superposition region of the URLLC control channel.

Further, the superposition transmission related information may include an avoidance indicator indicating whether the data of the second service is transmitted while avoiding the control channel region of the first service and an avoidance indicator indicating whether the data of the first service is transmitted while avoiding the control channel region of the second service. For example, the avoidance may mean that the data of the second service is transmitted in the resource other than the control channel region of the first service. Here, the data of the second service may be transmitted in a resource shifted by a predetermined number of RBs in the assigned resource.

Specifically, the eMBB avoidance indicator may mean information indicating whether or not the URLLC data is transmitted while avoiding the eMBB control channel if the collision with the resource assigned for transmitting the URLLC data in the eMBB control channel occurs. Further, the URLLC avoidance indicator may mean the eMBB superposition indicator may mean information indicating whether or not the eMBB data is transmitted while avoiding the URLLC control channel if the collision with the resource assigned for transmitting the eMBB data in the URLLC control channel occurs.

For example, if the eMBB avoidance indicator is 1, the URLLC data may be transmitted in the resource shifted by the predetermined number of resources in the eMBB control channel region. Further, if the URLLC avoidance indicator is 1, the eMBB data may be transmitted in the resource shifted by the predetermined number of resources in the URLLC control channel region.

In addition, if the avoidance indicator is set to be 1, the information (hereinafter, referred to as avoiding resource information) related to the predetermined number of RBs may be included in the superposition transmission related information.

Further, if the superposition transmission is performed in the superposition region in the control channel, the superposition transmission related information may include the puncturing information that is a ratio of superposed resources. In this case, the puncturing information may mean a ratio of the total amount of resources in the superposition region to the amount of resources in which the data of the second service is punctured.

Meanwhile, in the present disclosure, the superposition region may include a control channel superposition region that is a region in which resources assigned to the control channel region (for example, eMBB PDCCH and URLLC PDCCH) for the first terminal and the second terminal superposed with each other and a data channel superposition region that is a region in which resources assigned to the data channel region (for example, eMBB PDSCH and URLLC PDSCH) for the first terminal and the second terminal superposed with each other. At this time, the puncturing information in the control channel superposition region of the first terminal may be set to be equal to or smaller than the puncturing information in the data channel superposition region of the first terminal. The detailed content thereof will be described below.

In addition, the superposition transmission related information may include the superposition power information. The superposition power information may mean information related to power for transmitting data for the first service and data for the second service in the superposition region. The detailed content thereof will be described below.

In addition, the common control information may include the superposition transmission related information (hereinafter, second superposition transmission related information) including information such as puncturing information indicating the superposition ratio in the superposition region of the control channel of the second terminal and the superposition power information indicating the power ratio of data to another service. The detailed content is the same as those described above and therefore will be omitted below.

The first terminal that has identified the control channel location of the first terminal and the superposition transmission related information may decode the control information received through the control channel of the first terminal in step S450. At this time, the first terminal may decode information received in the control channel for the first terminal based on at least one of the superposition indicator, the puncturing information, and the superposition power information that are included in the superposition transmission related information.

Further, in step S460, the first terminal may receive data transmitted to the first terminal. The first terminal may operate a reception algorithm for the data region to receive data transmitted to the first terminal.

Figure 5A:
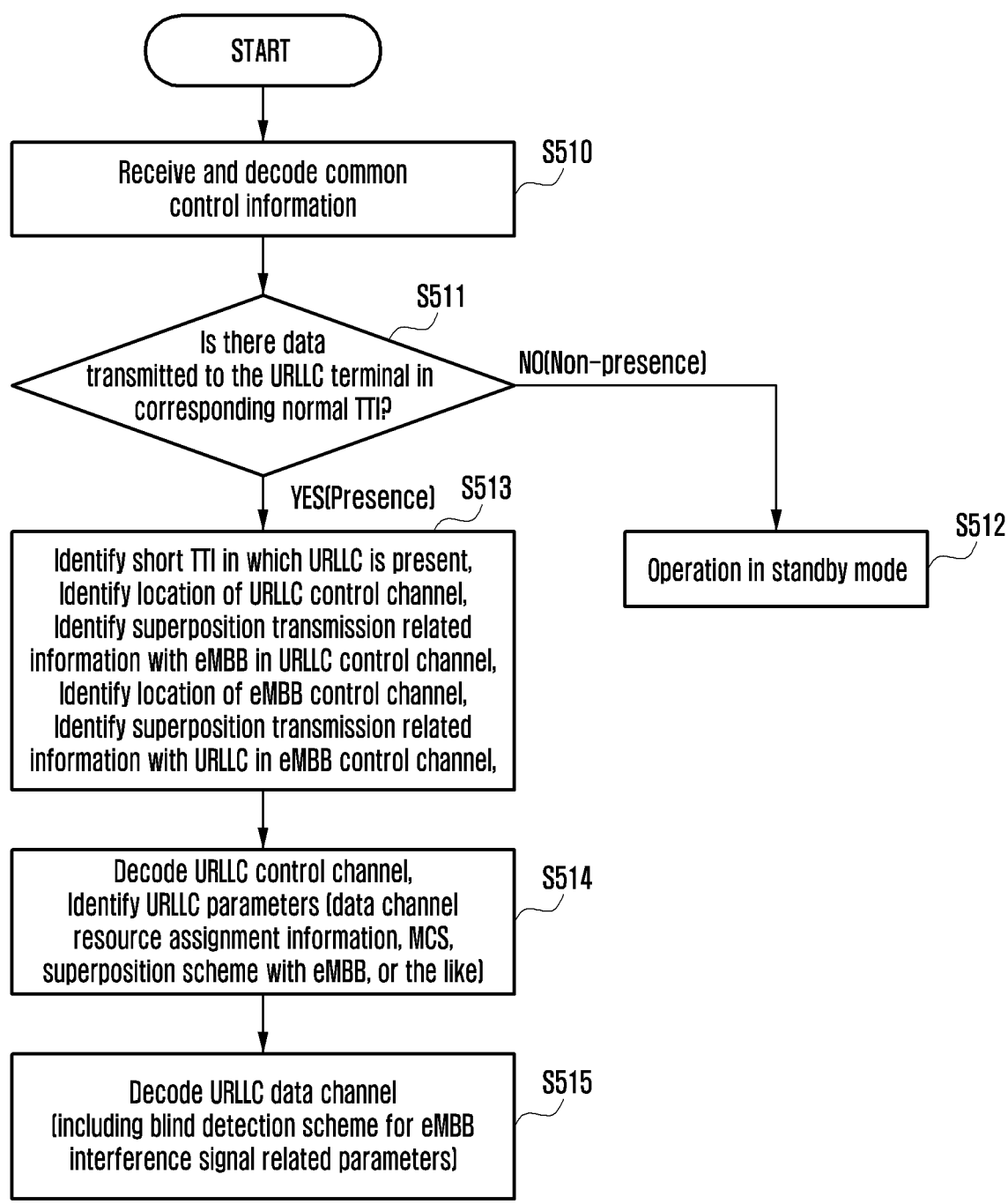
FIG. 5A is a flowchart illustrating a process for a URLLC terminal to receive URLLC control information and data according to the present disclosure.

FIG. 5A is a flowchart illustrating a process for a URLLC terminal to receive URLLC control information and data according to the present disclosure.

Referring to FIG. 5A, in step S510, the URLLC terminal may receive the common control information through the common control channel and decode the common control information.

In step S511, the URLLC terminal decoding the common control information may identify whether there is data transmitted to the URLLC terminal in the corresponding normal TTI based on the decoding result.

If there is no data to be transmitted to the URLLC terminal, in step S512, the URLLC terminal may be operated in the standby mode.

On the other hand, if there is the data to be transmitted to the URLLC terminal, in step S513, the URLLC terminal may identify the location of the URLLC control channel and the superposition transmission related information.

Specifically, the URLLC terminal may identify the TTI in which the URLLC data may be transmitted by using the common control information and identify the location of the URLLC control channel in the identified TTI. In addition, the URLLC terminal may identify the superposition transmission related information (hereinafter referred to as URLLC superposition transmission related information) with the eMBB service in the URLLC control channel by using the common control information.

In addition, the URLLC terminal may identify the location of the eMBB control channel and the superposition transmission related information (hereinafter referred to as eMBB superposition transmission related information) with the URLLC service in the eMBB control channel by using the common control information.

Further, in step S514, the URLLC terminal may decode the URLLC control information transmitted to the URLLC control channel.

The URLLC terminal may decode the URLLC control information using the superposition transmission related information in the URLLC control channel identified through the common control channel. As the decoding result, the URLLC terminal may identify URLLC parameters necessary for decoding the URLLC data. For example, the URLLC parameter may include at least one of resource assignment information of the URLLC data channel, modulation coding scheme (MCS) information, and a superposition scheme with the eMBB service.

Therefore, in step S515, the URLLC terminal may decode the URLLC data using the identified URLLC parameters. At this time, the URLLC terminal may apply a blind detection scheme to the interference signal related parameters.

Figure 5B:
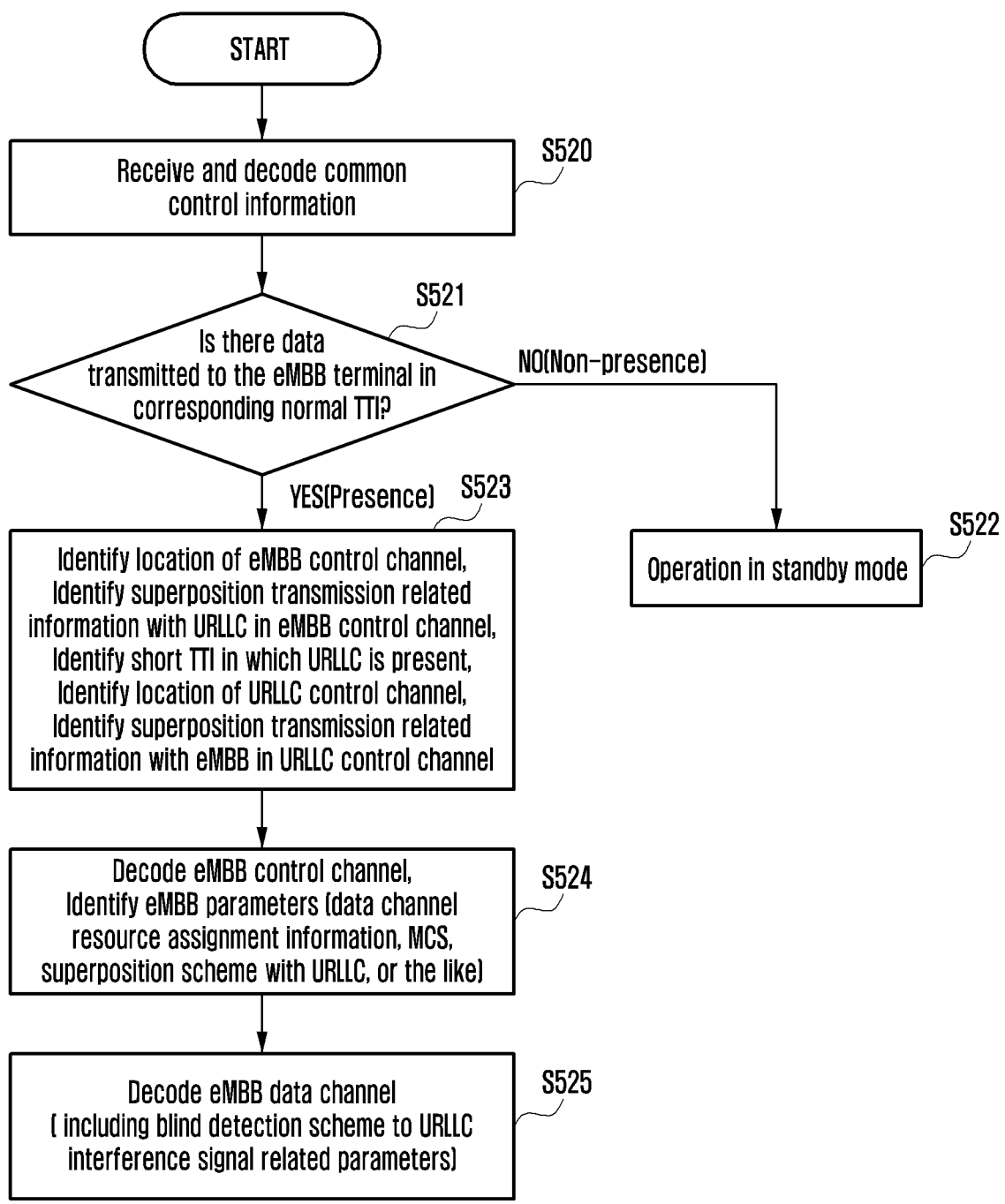
FIG. 5B is a flowchart illustrating a process for an eMBB terminal to receive eMBB control information and data according to the present disclosure.

FIG. 5B is a flowchart illustrating a process for an eMBB terminal to receive eMBB control information and data according to the present disclosure.

Referring to FIG. 5B, in step S520, the eMBB terminal may receive the common control information through the common control channel and decode the common control information.

In step S521, the eMBB terminal decoding the common control information may identify whether there is the data transmitted to the eMBB terminal in the corresponding normal TTI based on the decoding result.

If there is no data to be transmitted to the eMBB terminal, in step S522, the eMBB terminal may be operated in the standby mode.

On the other hand, if there is the data to be transmitted to the eMBB terminal, in step S523, the eMBB terminal may identify the location of the eMBB control channel and the superposition transmission related information.

In detail, the eMBB terminal may use the common control information to identify the location of the eMBB control channel. Further, the eMBB terminal may identify the eMBB superposition transmission related information using the common control information.

Further, the eMBB terminal may identify the TTI in which the URLLC data may be transmitted by using the common control information and identify the location of the URLLC control channel in the identified TTI. Further, the eMBB terminal may identify the URCCL superposition transmission related information.

Further, in step S524, the eMBB terminal may decode the eMBB control information transmitted to the eMBB control channel.

The eMBB terminal may decode the eMBB control information using the superposition transmission related information in the eMBB control channel identified through the common control channel. As the decoding result, the eMBB terminal may identify eMBB parameters necessary for decoding the eMBB data. For example, the eMBB terminal may identify the resource assignment information of the eMBB data channel, the MCS information, the superposition scheme with the URLLC service and the like.

Therefore, in step S525, the eMBB terminal may decode the eMBB data using the identified eMBB parameters. At this time, the eMBB terminal may apply the blind detection scheme to the interference signal related parameters.

Figure 5C:
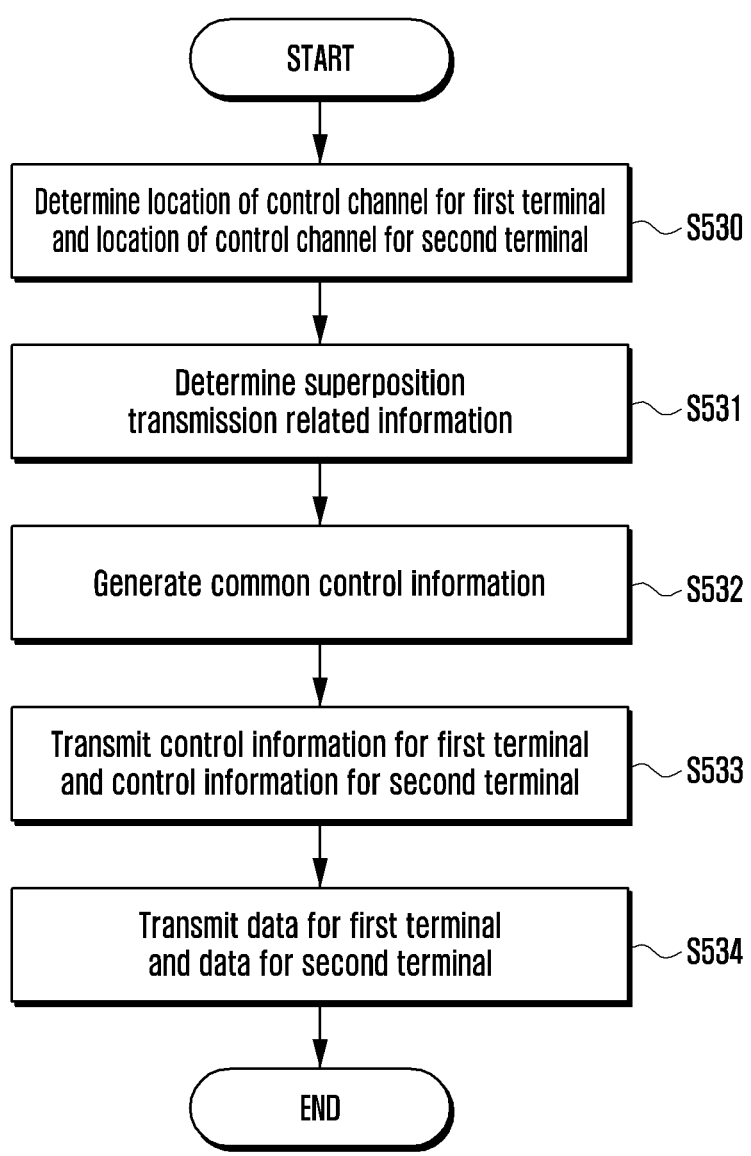
FIG. 5C is a block diagram illustrating an operation of a base station according to the present disclosure.

FIG. 5C is a block diagram illustrating an operation of a base station according to the present disclosure.

Referring to FIG. 5C, in step S530, the base station may determine the location of the control channel for the first terminal and the location of the control channel for the second terminal. The base station may include control channel candidate information for the first service and control channel candidate information for the second service. Accordingly, the base station may identify resources assigned to provide the second service and determine the location of the control channel of the first service where the region superposed with the resources of the second service is minimized. Likewise, the base station may identify resources assigned to provide the first service and determine the location of the control channel of the second service where the region superposed with the resources of the first service is minimized.

Further, in step S531, the base station may determine the superposition transmission related information. The superposition transmission related information may include the superposition related information (hereinafter, first superposition transmission related information) for the first service and the superposition related information (hereinafter, second superposition transmission related information) for the second service. The first superposition transmission related information and the second superposition transmission related information may each include at least one of the URLLC superposition transmission related information and the eMBB superposition transmission related information.

The first superposition transmission related information may include at least one of a superposition indicator indicating whether or not to perform the superposition transmission with the data of the second service in the control channel of the first service, an avoidance indicator indicating whether or not to shift and transmit the data of the second service in the control channel of the first service, the puncturing information when the superposition transmission is performed, and the superposition power information.

In step S532, the base station determining the location of the control channel and the superposition transmission related information generates the common control information including the control channel candidate information, the control channel related information indicating the location of the control channel, and the superposition transmission related information and may transmit the generated common control information through the common control channel. However, the control channel candidate information may be transmitted to the terminal by being included in the control information every predetermined period without being transmitted every time. Alternatively, the control channel candidate information may be transmitted in advance to the terminal through upper layer signaling (e.g., radio resource control (RRC) signaling). Alternatively, the control channel candidate information may also be transmitted to the terminal by being included in control channel related information.

The detailed method for transmitting a location of a control channel and superposition transmission related information will be described later.

Further, in step S533, the base station generates the control information for transmitting the data for the first terminal and the control information for transmitting the data for the second terminal, and may transmit the control information through the control channels of each terminal.

The control information may include a location of a resource to which data is transmitted to the first terminal, the MCS information, and the like.

Further, in step S534, the base station may transmit the data for the first terminal and the data for the second terminal through the data channels of each terminal.

Figure 6A:
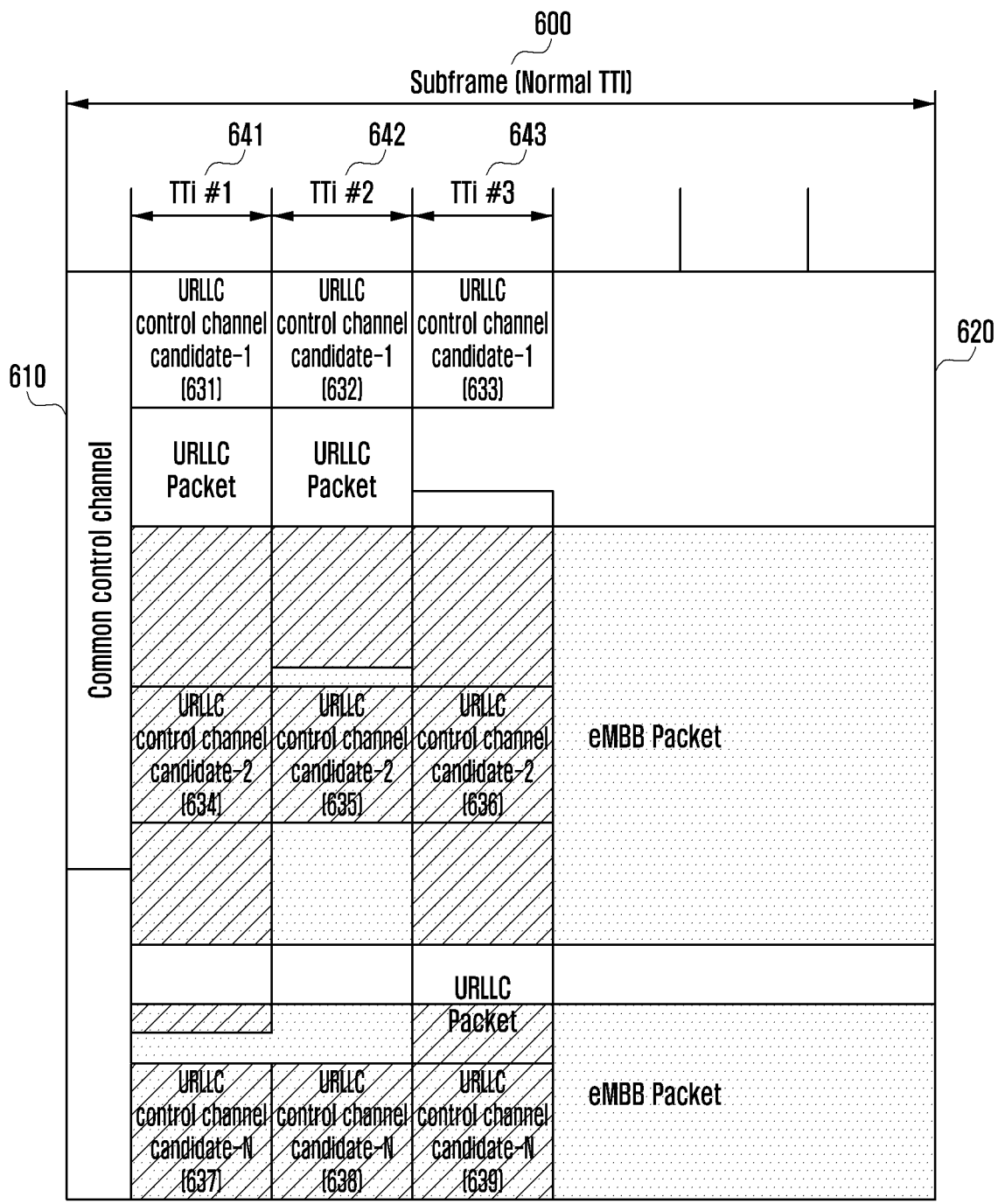
FIG. 6A is a diagram illustrating a first method for a URLLC terminal to receive URLLC control information and data according to an embodiment of the present disclosure.

FIG. 6A is a diagram illustrating a first method for a URLLC terminal to receive URLLC control information and data according to an embodiment of the present disclosure.

Referring to FIG. 6A, the normal TTI may consist of one subframe 600. In addition, one subframe 600 may consist of a common control channel region 610 and a data region 620 (or PDSCH region).

The first method is characterized in that the base station does not perform the superposition transmission with the data for the eMBB service in the URLLC control channel region.

The base station may transmit the superposition indicator indicating whether or not to use the superposition with the eMBB data in the superposition region of the URLLC control channel to the terminal by including the superposition indicator in the common control information. An indicator indicating whether or not to the superposition is made in the URLLC control channel may be referred to as a URLLC superposition indicator. The base station may not transmit the eMBB data through the URLLC control channel, and the base station may set the superposition indicator to be 0 (full puncturing). On the other hand, the base station may allow the superposition with the eMBB data in the URLLC control channel, and the base station may set the superposition indicator to be 1.

Alternatively, the base station may transmit the control information not including the superposition indicator to the URLLC terminal. If the received control information does not include the superposition indicator, the terminal may determine that the superposition transmission is not performed on the URLLC control channel. At this time, the base station may select the URLLC control channel that is not superposed with the resource assigned to provide the eMBB service and transmit the URLLC control information.

Alternatively, the base station may not transmit the superposition indicator, and the terminal may determine that superposition transmission is performed if the puncturing information or the superposition power information to be described later is received.

In addition, the base station may transmit to the terminal a URLLC avoidance indicator indicating whether the eMBB data is transmitted while being superposed on the URLLC control channel or whether the eMBB data is transmitted while avoiding the URLLC control channel.

The avoidance may mean that the eMBB data is transmitted in the resource other than the URLLC control channel region. Here, the eMBB data may be transmitted in a resource shifted by a predetermined number of RBs in the assigned resource.

Also, if the avoidance indicator is set to be 1, the superposition related information may include avoidance resource information that is the information related to the predetermined number of RBs. At this time, the number of RBs may be indicated depending on a predetermined number of bits. For example, 00: 1RB, 01: 2RB, 10: 3RB, and 11: 4RB may be indicated.

For example, if 00 is included in the avoidance resource information, the URLLC terminal may identify that the base station shifts data by 1 RB in the eMBB control channel and transmits the data. Therefore, the URLLC terminal may receive the data in consideration of the resource to which the avoidance is applied.

As described above, in the first method, the base station does not perform the superposition transmission with the eMBB data in the URLLC control channel region, and the base station sets the superposition indicator to be 0 and transmits the superposition indicator to the terminal. Therefore, the terminal may decode the URLLC control information received through the control channel in consideration of whether or not the superposition is generated in the URLLC control channel.

In addition, the terminal may identify the resource assignment region, in which the URLLC data is transmitted by using the URLLC control information, and receive the URLLC data.

Meanwhile, in order to receive the URLLC data, the terminal needs to receive the URLLC control information and know the location of the URLLC control channel. Accordingly, the base station may store the control channel candidate information that may be the URLLC control channel. The control channel candidate information may be configured in the form of a set including a location of at least one URLLC control channel.

Further, if the URLLC service is triggered, the base station may transmit the common control information to the URLLC terminal through the common control channel. At this time, the common control information may include the control channel related information related to the location of the URLLC control channel. The base station may identify the resources assigned to provide the eMBB service and transmit the location of the control channel where the region superposed with the resource of the eMBB is minimized to the URLLC terminal by including the location of the control channel in the control channel related information.

At this time, various methods may be used for the base station to configure the control channel related information.

For example, the base station may configure the location of the control channel of the first terminal as indexes of a time base and a frequency base and transmit the location of the control channel to the terminal.

Alternatively, the base station may notify the terminal of the control channel candidate information, and may transmit to the terminal the control channel related information indicating the control channel in which the region superposed with the eMBB resource is minimized among the control channel candidates. At this time, the control channel candidate information may be transmitted to the terminal by being included in the control information every predetermined period without being transmitted every time. Alternatively, the control channel candidate information may be transmitted in advance to the terminal through upper layer signaling (e.g., radio resource control (RRC) signaling). Alternatively, the control channel candidate information may also be transmitted to the terminal by being included in control channel related information.

For example, candidates that may be the URLLC control channel include control channel candidate 1 (631, 632, 633), control channel candidate 2 (634, 635, 636), control channel candidates 637, 638, and 639 that are illustrated in FIG. 6A.

The control channel candidate may be divided into an index of a TTI where a control channel may exist and a location index of a URLLC control channel in each TTI. For example, the base station may set the TTI #1(641): 000, TTI #2(642): 001, and TTI #3(643): 010 and set the location information of the URLLC control channel in each TTI to be 00: candidate-1, 01: candidate-2, 10: candidate-3.

Therefore, if the base station includes information 000 01 as the control channel related information by including the information 000 01 in the common control information, the terminal may identify that the URLLC control channel candidate 1 (631) included in the TTI #1 is the URLLC control channel.

Alternatively, the base station may transmit a start location of the URLLC control channel and the number of resource blocks to the terminal by including the start location and the number of resource blocks in the control information. For example, TTI #1(641): 000, TTI #2(642): 001, TTI #3(643): 010 may be set and the number of resource blocks may be set using a predetermined number of bits. Further, the location information of the URLLC control channel in the corresponding TTI may be set to be 00: candidate-1, 01: candidate-2, and 10: candidate-3.

Accordingly, if the base station transmits information 000 010 00 00 00 by including the information 000 010 00 00 00 in the control channel related information, 000 010 may indicate three TTI ranges starting from TTI #1 and 00 00 00 may identify that the URLLC control channel candidate 1 (631, 632 and 633) included in the TT1#1, the TTI #2, and the TTI #3 are the URLLC control channel.

Therefore, the URLLC terminal that has identified the URLLC control channel may receive the URLLC control information through the control channel and receive the URLLC data based on the URLLC control information. In addition, the superposition transmission related information may be identified by the eMBB terminal through the common control information, and the eMBB terminal may receive the data in consideration of the resources to which the avoidance is applied.

Meanwhile, the superposition transmission related information including the superposition indicator, the avoidance indicator, and the avoidance resource information, the control channel related information, the control channel candidate information, and the like may be transmitted through the data region indicated by the control information without being included in the control information.

Figure 6B:
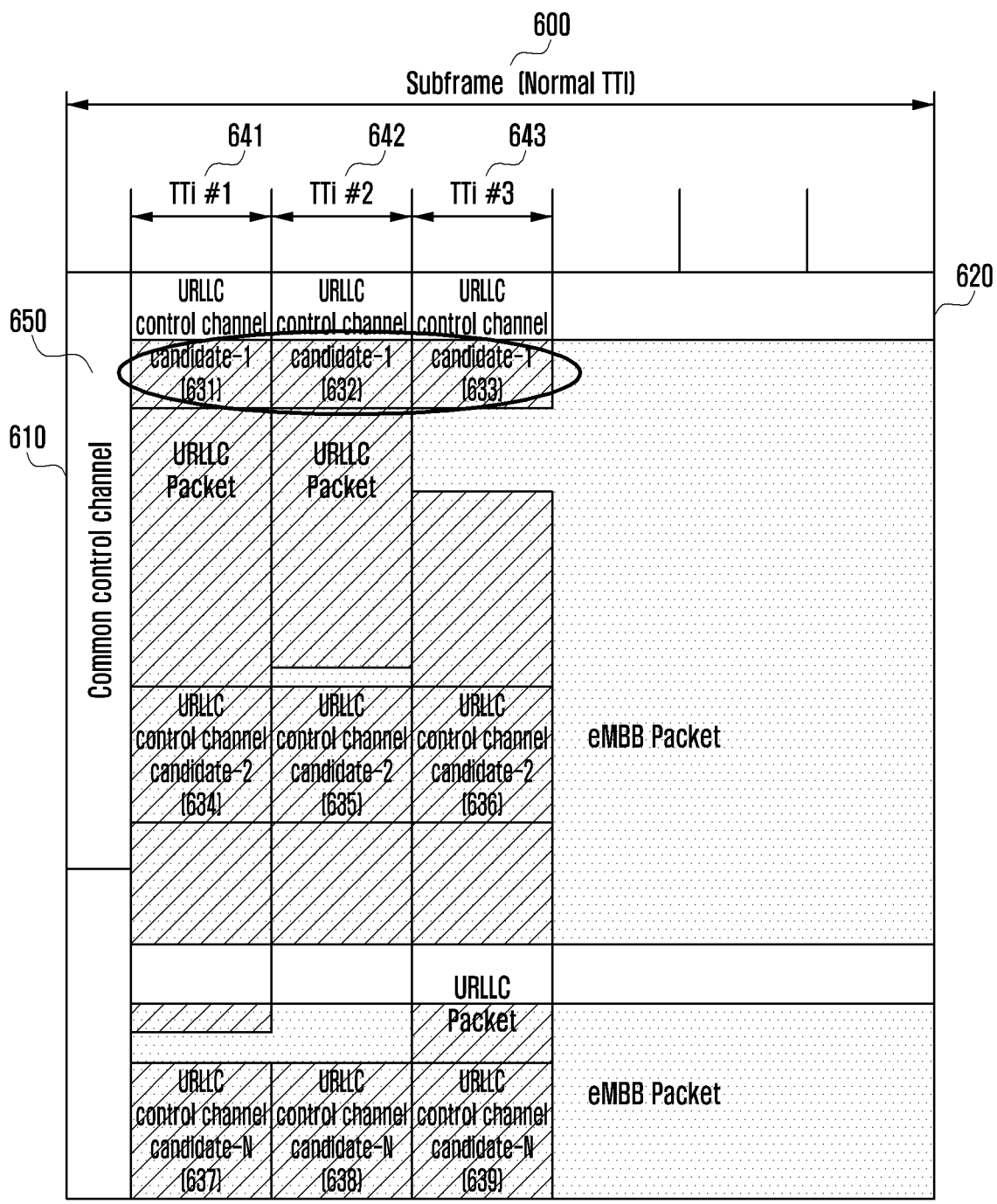
FIG. 6B is a diagram illustrating a second method to a fourth method for a URLLC terminal to receive URLLC control information and data according to an embodiment of the present disclosure.

FIG. 6B is a diagram illustrating a second method to a fourth method for a URLLC terminal to receive URLLC control information and data according to an embodiment of the present disclosure.

The second method is characterized in that the superposition transmission with the data for the eMBB service is performed in the URLLC control channel region.

As described in the first method, the base station may store the control channel candidate information that may be the URLLC control channel, and may identify the resource assigned to the eMBB service to transmit the control channel related information indicating the control channel in which the region superposed with the eMBB resource is minimized to the URLLC terminal.

The detailed content thereof is similar to those described above and therefore will be omitted below.

Further, in the second method, the base station may perform partial puncturing on the eMBB service even in a superposition region 650 of the URLLC control channel, in order to prevent the performance of the eMBB service from deteriorating.

Therefore, in order to notify the terminal that the partial puncturing is performed on the eMBB service is performed even in the URLLC control channel region, the base station may set the superposition indicator to be 1 and transmit the superposition indicator to the terminal. Alternatively, the base station may not transmit the superposition indicator, and if the puncturing information is received, the terminal may recognize that the superposition transmission has been performed.

In addition, as described above, the base station may transmit the URLLC avoidance indicator indicating whether the eMBB data is superposed in the URLLC control channel. The detailed content thereof is the same as those described above and therefore will be omitted below.

Meanwhile, the base station should determine the puncturing information in the URLLC control channel region, and the method for determining puncturing information is as follows.

First, the base station may apply the puncturing information in the URLLC control channel region like the puncturing information in the URLLC data region. Accordingly, the base station may perform puncturing in the control channel region using the puncturing information applied in the data region.

Second, the base station may set a puncturing ratio in the URLLC control channel region to be different from a puncturing ratio in the URLLC data region. At this time, the base station may set the puncturing ratio in the URLLC control channel region to be larger than the puncturing ratio in the URLLC data region. The base station may use the following method to transmit the puncturing information.

For example, the base station may include the candidate puncturing information, and the candidate puncturing information may be indicated using an index. Accordingly, the base station may select the puncturing information of any one of the candidate puncturing information, and may transmit the selected puncturing information to the terminal by including the index of the selected puncturing information in the control information. For example, the candidate puncturing information may include $2/3$, $3/4$, $4/5$, $5/6$, and the like. Further, the puncturing information may be indicated using indexes such as 00: $2/3$, 01: $3/4$, 10: $4/5$, and 11: $5/6$. Accordingly, the base station may determine the puncturing information, and may transmit the index corresponding to the puncturing information to the terminal. For example, if the puncturing information includes 11, the base station may transmit the eMBB data only in $1/6$ of the resources assigned to the eMBB in the superposition region, leaving $5/6$ of the resources empty.

As another example, the base station may transmit 1-bit information indicating whether the puncturing ratio in the URLLC control channel region is differently set from the control information in the URLLC data region to be set as the puncturing information and transmit the 1-bit information to the terminal. The information may be transmitted by being included in the common control information. Accordingly, if the indicator is set to be 1, the base station may transmit data using the puncturing information determined according to predetermined rules, and the URLLC terminal may identify the puncturing information according to predetermined rules.

For example, according to the predetermined rules, if the puncturing information of the URLLC data channel region is x, the puncturing information of the URLLC control channel region may be $(1+x)/2$. Accordingly, if the puncturing information included in the common control information is set to be 1, the terminal may identify the puncturing information applied to the URLLC control channel region using the rules.

However, in the second method, the base station may set the superposition power information in the URLLC control channel region and the superposition power information in the URLLC data region to be equal.

In this way, the partial puncturing may be performed on the eMBB service even in the URLLC control channel region, such that the performance deterioration of the eMBB service may be prevented and the puncturing ratio of the control channel is set to be higher than that of the data channel, such that the reliability of information transmitted to the URLLC control channel may be maintained at a high level.

Therefore, the terminal may decode the URLLC control information received through the control channel in consideration of the fact that the superposition is generated in the control channel.

Meanwhile, the superposition transmission related information including the superposition indicator, the puncturing information, the avoidance indicator, and the avoidance resource information, the control channel related information, the control channel candidate information, and the like may be transmitted through the data region indicated by the control information without being included in the control information.

Meanwhile, even in the third method, the base station may perform partial puncturing on the eMBB service even in the superposition region 650 of the URLLC control channel, in order to prevent the performance of the eMBB service from deteriorating.

Therefore, like the second method, in order to notify the terminal that the partial puncturing is performed on the eMBB service is performed even in the URLLC control channel region, the base station may set the superposition indicator to be 1 and transmit the superposition indicator to the terminal. Alternatively, the base station may not transmit the superposition indicator, and if the superimposition power information is received, the terminal may recognize that the superposition transmission has been performed.

In addition, as described above, the base station may transmit the URLLC avoidance indicator indicating whether the eMBB data is superposed in the URLLC control channel. The detailed content thereof is the same as those described above and therefore will be omitted below.

However, unlike the second method, in the third method, the base station may transmit the superposition power information in the superposition region of the URLLC control channel to the terminal instead of transmitting the puncturing information in the URLLC control channel region to the terminal.

The power at which the base station may transmit at one time is limited and the base station may set the power for transmitting the data for the eMBB service and the data for the URLLC service to be different from each other in the URLLC control channel region. The power ratio of transmitting the data for the eMBB service and the data for the URLLC service may be referred to as the superposition power information, and a method for determining superposition power information is as follows.

First, the base station may apply the superposition power information in the URLLC control channel region like the superposition power information in the URLLC data region. Accordingly, the base station may perform the transmission of the data in the control channel region using the superposition power information applied in the data region.

Second, the base station may set the superposition power information in the URLLC control channel region to be different from the superposition power information in the URLLC data region. At this time, the base station may set the power for transmitting the data for the eMBB service in the URLLC control channel region to be smaller than the power for transmitting the data for the eMBB service in the URLLC data region. For example, the ratio of the power for transmitting the data for the eMBB service in the URLLC data region and the power for transmitting the data for the URLLC service may be set to be 0.2:0.8, while the ratio of the power for transmitting the data for the eMBB service in the URLLC control channel region to the power for transmitting the data for the URLLC service may be set to be 0.1:0.9.

Specifically, the base station may use the following method to transmit the superposition power information.

For example, the base station may include the candidate superposition power information, and the candidate superposition power information may be indicated using the index. Accordingly, the base station may select the superposition power information of any one of the candidate superposition power information, and may transmit the selected superposition power information to the terminal by including the index of the selected superposition power information in the control information. For example, the candidate superposition power information may include ¼, ⅙, ⅛, ⅒, and the like. In this case, the candidate superposition power information may mean the ratio of the power for transmitting the eMBB data and the power for transmitting the URLLC control information in the URLLC control channel region. Also, the superposition power information may be indicated using an index such as 00: ¼, 01: ⅙, 10: ⅛, and 11: ⅒. Accordingly, the base station may determine the superposition power information, and may transmit the index corresponding to the superposition power information to the terminal. For example, if 11 is included in the superposition power information, the base station may transmit the URLLC control information using power of 10 times as large as that of the eMBB data.

As another example, the base station may transmit a 1-bit indicator indicating whether the superposition power information in the URLLC control channel region is differently set from the control information in the URLLC data region to be set as the superposition power information and transmit the 1-bit indicator to the terminal. The information may be transmitted by being included in the common control information. Accordingly, if the indicator is set to be 1, the base station may transmit data using the superposition power information determined according to the predetermined rules, and the URLLC terminal may identify the superposition power information according to the predetermined rules.

For example, depending on the predetermined rules, if the superposition power information of the URLLC data channel region is y, the superposition power information of the URLLC control channel region may be set to be y/2. Accordingly, if the indicator included in the common control information is set to be 1, the terminal may identify the superposition power information applied to the URLLC control channel region using the rules.

However, in the second method, the base station may set the puncturing information in the URLLC control channel region and the puncturing information in the URLLC data region to be equal.

In this way, the partial puncturing may be performed on the eMBB service even in the URLLC control channel region, such that the performance deterioration of the eMBB service may be prevented and the transmit power of the eMBB data in the control channel is set to be lower than that of the data channel, such that the reliability of information transmitted to the URLLC control channel may be maintained at a high level.

Therefore, the terminal may decode the URLLC control information received through the control channel in consideration of the fact that the superposition is generated in the control channel and the superposition power information.

Meanwhile, the superposition transmission related information including the superposition indicator, the avoidance indicator, the avoidance resource information, the superposition power information, or the like, the control channel related information, the control channel candidate information, and the like may be transmitted through the data region indicated by the control information without being included in the control information.

Meanwhile, even in a fourth method, the base station may perform partial puncturing on the eMBB service even in the superposition region 650 of the URLLC control channel, in order to prevent the performance of the eMBB service from deteriorating.

Therefore, like the second method and the third method, in order to notify the terminal that the partial puncturing is performed on the eMBB service is performed even in the URLLC control channel region, the base station may set the superposition indicator to be 1 and transmit the superposition indicator to the terminal. Alternatively, the base station may not transmit the superposition indicator, and if the puncturing information or the superimposition power information is received, the terminal may recognize that the superposition transmission has been performed.

In addition, as described above, the base station may transmit the URLLC avoidance indicator indicating whether the eMBB data is superposed in the URLLC control channel. The detailed content thereof is the same as those described above and therefore will be omitted below.

However, in the fourth method, the base station may use both the puncturing information and the superposition power information used in the second method and the third method. Therefore, the base station may transmit both the puncturing information and the superposition power information to the terminal.

Accordingly, the base station may apply the puncturing information and the superposition power information in the URLLC control channel region like the puncturing information and the superposition power information in the URLLC data region. Accordingly, the base station may perform the transmission of the data in the control channel region using the puncturing information and the superposition power information applied in the data region.

Further, the base station may set the puncturing information and the superposition power information in the URLLC control channel region to be different from the superposition power information in the URLLC data region.

Therefore, the base station should determine the puncturing information and the superposition power information that are different from those in the URLLC data region and transmit the determined puncturing information and superposition power information to the terminal. The method for determining, by a base station, puncturing information and superposition power information and transmitting the puncturing information and the superposition power information to a terminal is the same as described above, and may be omitted below.

Meanwhile, the superposition transmission related information including the superposition indicator, the avoidance indicator, the puncturing information, and the superposition power information, the control channel related information, the control channel candidate information, and the like may be transmitted through the data region indicated by the control information without being included in the control information.

Figure 7A:
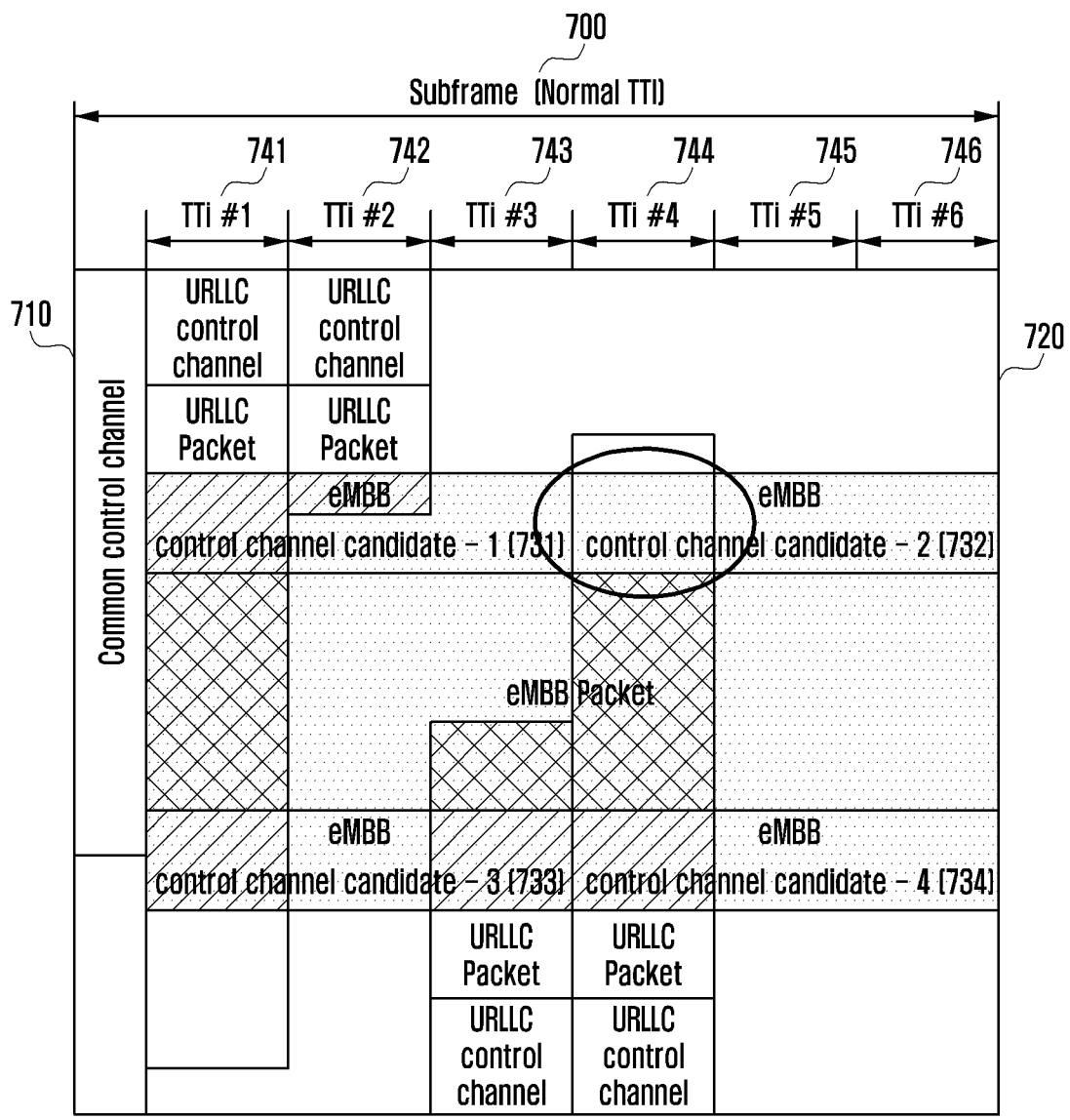
FIG. 7A is a diagram illustrating a first method for an eMBB terminal to receive eMBB control information and data according to another embodiment of the present disclosure.

FIG. 7A is a diagram illustrating a first method for an eMBB terminal to receive eMBB control information and data according to another embodiment of the present disclosure.

Referring to FIG. 7A, the normal TTI may consist of one subframe 700. In addition, one subframe 700 may consist of a common control channel region 710 and a data region 720 (or PDSCH region).

The first method is characterized in that the base station does not perform the superposition transmission with the data for the URLLC service in the eMBB control channel region.

The base station may transmit the superposition indicator indicating whether or not to use the superposition with the URLLC data in the superposition region of the eMBB control channel to the terminal by including the superposition indicator in the common control information. An indicator indicating whether or not to the superposition is made in the eMBB control channel may be referred to as an eMBB superposition indicator. The base station may not transmit the eMBB control information in the superposition region of the eMBB control channel (full puncturing), and the base station may set the superposition indicator to be 0. On the other hand, the base station may allow the superposition of the eMBB control information with the URLLC data in the superposition region of the eMBB control channel (partial puncturing), and the base station may set the superposition indicator to be 1.

Alternatively, the base station may transmit the control information not including the superposition indicator to the eMBB terminal. If the received control information does not include the superposition indicator, the terminal may determine that the superposition transmission is not performed on the eMBB control channel. At this time, the base station may select the eMBB control channel that is not superposed with the resource assigned to provide the URLLC service and transmit the eMBB control information.

Alternatively, the base station may not transmit the superposition indicator, and the terminal may determine that superposition transmission is performed if the puncturing information or the superposition power information to be described later is received.

As described above, in the first method, the base station does not perform the superposition transmission with the URLLC data in the eMBB control channel region, and the base station sets the superposition indicator to be 0 and transmits the superposition indicator to the terminal. Therefore, the terminal may decode the eMBB control information received through the control channel in consideration of whether or not the superposition is generated in the eMBB control channel.

In addition, the terminal may identify the resource assignment region, in which the eMBB data is transmitted by using the eMBB control information, and receive the eMBB data.

In order to receive the eMBB data, the terminal needs to receive the eMBB control information and know the location of the eMBB control channel. Accordingly, the base station may store the control channel candidate information that may be the eMBB control channel. The control channel candidate information may be configured in the form of a set including a location of at least one eMBB control channel.

Further, if the eMBB service is triggered, the base station may transmit the common control information to the eMBB terminal through the common control channel. At this time, the common control information may include the control channel related information related to the location of the eMBB control channel. The base station may identify the resources assigned to provide the URLLC service and transmit the location of the control channel where the region superposed with the resource of the URLLC is minimized to the eMBB terminal by including the location of the control channel in the control channel related information.

At this time, various methods may be used for the base station to configure the control channel related information.

For example, the base station may configure the location of the control channel of the second terminal as indexes of a time base and a frequency base and transmit the location of the control channel to the terminal.

Alternatively, the base station may notify the terminal of the control channel candidate information, and may transmit to the terminal the control channel related information indicating the control channel in which the region superposed with the eMBB resource is minimized among the control channel candidates. At this time, the control channel candidate information may be transmitted to the terminal by being included in the control information every predetermined period without being transmitted every time. Alternatively, the control channel candidate information may be transmitted in advance to the terminal through upper layer signaling (e.g., radio resource control (RRC) signaling). Alternatively, the control channel candidate information may also be transmitted to the terminal by being included in control channel related information.

For example, the candidate that may be eMBB control channels may include control channel candidate 1 (731), control channel candidate 2 (732), control channel candidate 3 (733), and control channel candidate 4 (734) illustrated in FIG. 7A and the base station may transmit control channel candidate information including the control channel candidate to the terminal.

The control channel candidate may be divided by an index of predetermined bits. For example, the base station may set 00: channel candidate 1 (731), 01: control channel candidate 2 (732), 10: control channel candidate 3 (733), and 11: control channel candidate 4 (734). Therefore, the base station may select the control channel candidate 2 (732) which is the location of the control channel where the region superposed with the resource of the URLLC is minimized, and may transmit 11 that is an index of the corresponding control channel candidate to the terminal by including the 11 in the control information. Accordingly, the terminal may check the index 11 of the control channel candidate and identify the location of the eMBB control channel.

Alternatively, the base station may transmit a start location of the eMBB control channel and the number of resource blocks to the terminal by including the start location and the number of resource blocks in the control information. For example, TTI #1(741): 000, TTI #2(742): 001, TTI #3(743): 010, TTI #4(744): 011, TTI #5(745): 100, TTI #6(746): 101 may be set and the number of resource blocks may be set using a predetermined number of bits. Further, the location information of the eMBB control channel in the corresponding TTI may be set to be 00: candidate-1, 01: candidate-2, and 10: candidate-3, and 11: candidate-4.

Accordingly, if the base station transmits information 000 010 00 by including the information 000 010 00 in the control channel related information, 000 010 may indicate three TTI ranges starting from TTI #1 and 00 may identify that the eMBB control channel candidate 1 (731) included in the TT1#1, the TTI #2, and the TTI #3 is the URLLC control channel.

In addition, the base station may transmit to the terminal a URLLC avoidance indicator indicating whether the eMBB data is transmitted while being superposed on the URLLC control channel or whether the data of the URLLC service is transmitted while avoiding the eMBB control channel.

The avoidance may mean that the URLLC data is transmitted in the resource other than the eMBB control channel region. Here, the URLLC data may be transmitted in a resource shifted by a predetermined number of RBs in the assigned resource. Also, if the avoidance indicator is set to be 1, the superposition related information may include avoidance resource information that is the information related to the predetermined number of RBs. At this time, the number of RBs may be indicated depending on a predetermined number of bits. For example, 00: 1RB, 01: 2RB, 10: 3RB, and 11: 4RB may be indicated.

Accordingly, if the base station transmits information such as 01 1 00 as the superposition transmission related information, the eMBB terminal may identify based on 01 that the control channel candidate 2 (732) is the eMBB control channel, identify based on 1 that the avoidance of the URLLC is generated, and identify based on 00 that the URLLC data signal in the eMBB control channel is shifted by 1 RB to avoid the eMBB control channel to transmit data. Therefore, the eMBB terminal may perform decoding by reflecting the fact that there is no URLLC interference signal in the control channel of the eMBB terminal. In addition, the superposition transmission related information may be identified by the URLLC terminal through the common control information, and the URLLC terminal may receive the data in consideration of the resources to which the avoidance is applied.

Meanwhile, the superposition transmission related information including the superposition indicator, the avoidance indicator, and the avoidance resource information, the control channel related information, the control channel candidate information, and the like may be transmitted through the data region indicated by the control information without being included in the control information.

Figure 7B:
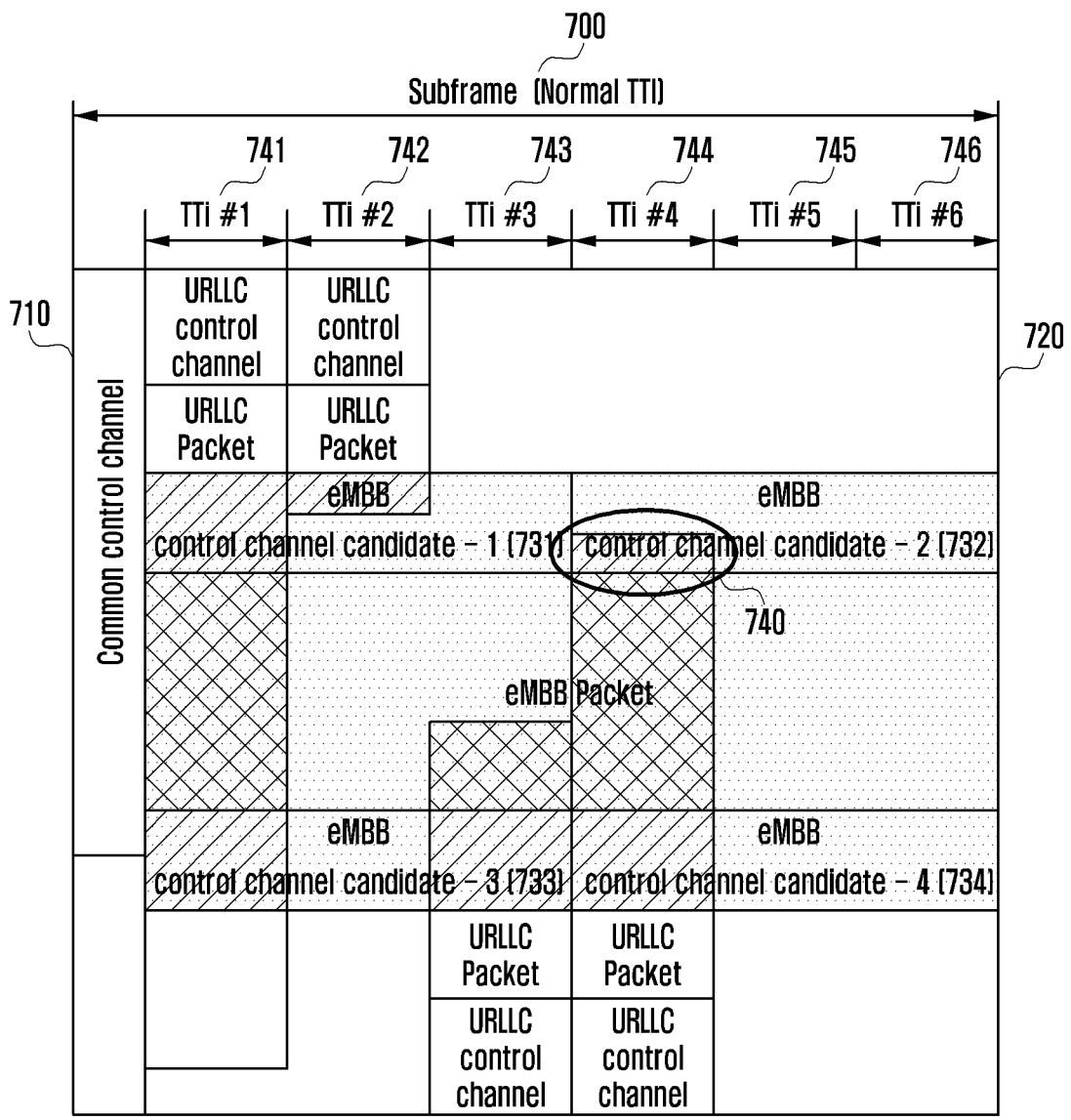
FIG. 7B is a diagram illustrating a second method to a fourth method for an eMBB terminal to receive eMBB control information and data according to an embodiment of the present disclosure.

FIG. 7B is a diagram illustrating a second method to a fourth method for an eMBB terminal to receive eMBB control information and data according to an embodiment of the present disclosure.

The second method is characterized in that the superposition transmission with the data for the URLLC service is performed in the eMBB control channel region.

As described in the first method, the base station may store the control channel candidate information that may be the eMBB control channel, and may identify the resource assigned to the URLLC service to transmit the control channel related information indicating the control channel in which the region superposed with the URLLC resource is minimized to the eMBB terminal.

The detailed content thereof is similar to those described above and therefore will be omitted below.

Further, in the second method, the base station may perform the partial puncturing on the eMBB service even in a superposition region 740 of the eMBB control channel, in order to prevent the performance deterioration of the URLLC service and the increase in the latency time.

Therefore, in order to notify the terminal that the partial puncturing is performed on the eMBB service is performed even in the eMBB control channel region, the base station may set the superposition indicator to be 1 and transmit the superposition indicator to the terminal. Alternatively, the base station may not transmit the superposition indicator, and if the puncturing information is received, the terminal may recognize that the superposition transmission has been performed.

In addition, as described above, the base station may transmit the avoidance indicator indicating whether the data of the URLLC service is superposed in the eMBB control channel. The detailed content thereof is the same as those described above and therefore will be omitted below.

Meanwhile, the base station should determine the puncturing information in the eMBB control channel region, and the method for determining puncturing information is as follows.

First, the base station may apply the puncturing information in the eMBB control channel region like the puncturing information in the eMBB data region. Accordingly, the base station may perform puncturing in the control channel region using the puncturing information applied in the data region.

Second, the base station may set a puncturing ratio in the eMBB control channel region to be different from a puncturing ratio in the eMBB data region. At this time, the base station may set the puncturing ratio in the eMBB control channel region to be smaller than the puncturing ratio in the eMBB data region. This is to keep the reliability of the eMBB control information high. The base station may use the following method to transmit the puncturing information.

For example, the base station may include the candidate puncturing information, and the candidate puncturing information may be indicated using an index. Accordingly, the base station may select the puncturing information of any one of the candidate puncturing information, and may transmit the selected puncturing information to the terminal by including the index of the selected puncturing information in the control information. For example, the candidate puncturing information may include ⅔, ¾, ⅘, ⅚, and the like. Further, the puncturing information may be indicated using indexes such as 00: ⅔, 01: ¾, 10: ⅘, and 11: ⅚. Accordingly, the base station may determine the puncturing information, and may transmit the index corresponding to the puncturing information to the terminal. For example, if the puncturing information includes 11, the base station may transmit the eMBB control information only in ⅙ of the resources assigned to the eMBB control channel in the superposition region, leaving ⅚ of the resources empty.

As another example, the base station may transmit 1-bit information indicating whether the puncturing ratio in the eMBB control channel region is differently set from the control information in the eMBB data region to be set as the puncturing information and transmit the 1-bit information to the terminal. The information may be transmitted by being included in the common control information. Accordingly, if the indicator is set to be 1, the base station may transmit data using the puncturing information determined according to predetermined rules, and the eMBB/URLLC terminal may identify the puncturing information according to predetermined rules.

For example, according to the predetermined rules, if the puncturing information of the eMBB data channel region is $1-1/x$, the puncturing information of the eMBB control channel region may be $1-1/(x-2)$. In this case, x may mean a reference block size for performing the puncturing in the eMBB data channel region. For example, if x=4, the transmission is performed in only one block based on four blocks, the puncturing may be performed in the remaining blocks, and the puncturing information may be $1-¼=¾$. However, the above example may be applied if x is greater than or equal to 3.

Therefore, if x=3, the puncturing information of the eMBB data channel is ⅔, and the puncturing information of the eMBB control channel is 0 which may mean that the puncturing is not performed. Further, if x=4, the puncturing information of the eMBB data channel is ¾, and the puncturing information of the eMBB control channel may be ½.

In this way, if the puncturing information included in the common control information is set to be 1, the terminal may identify the puncturing information using the rules.

However, in the second method, the base station may set the superposition power information in the eMBB control channel region and the superposition power information in the eMBB data region to be equal.

In this way, the partial puncturing may be performed on the eMBB service even in the eMBB control channel region, such that the performance deterioration of the URLLC service and the increase in the latency speed may be prevented and the puncturing ratio of the control channel is set to be lower than that of the data channel, such that the reliability of information transmitted to the eMBB control channel may be maintained at a high level.

Therefore, the terminal may decode the URLLC control information received through the control channel in consideration of the fact that the superposition is generated in the control channel.

Meanwhile, the superposition transmission related information including the avoidance indicator, the superposition indicator, the avoidance resource information, and the puncturing information, the control channel related information, the control channel candidate information, and the like may be transmitted through the data region indicated by the control information without being included in the control information.

Meanwhile, even in the third method, the base station may perform partial puncturing on the eMBB service even in the superposition region 740 of the eMBB control channel, in order to prevent the performance of the URLLC service from deteriorating.

Therefore, like the second method, in order to notify the terminal that the partial puncturing is performed on the eMBB service is performed even in the eMBB control channel region, the base station may set the superposition indicator to be 1 and transmit the superposition indicator to the terminal. Alternatively, the base station may not transmit the superposition indicator, and if the superimposition power information is received, the terminal may recognize that the superposition transmission has been performed.

In addition, as described above, the base station may transmit the avoidance indicator indicating whether the data of the URLLC service is superposed in the eMBB control channel. The detailed content thereof is the same as those described above and therefore will be omitted below.

However, unlike the second method, in the third method, the base station may transmit the superposition power information in the superposition region of the eMBB control channel to the terminal instead of transmitting the puncturing information in the eMBB control channel region to the terminal.

The power at which the base station may transmit at one time is limited and the base station may set the power for transmitting the data for the eMBB service and the data for the URLLC service to be different from each other in the eMBB control channel region. The power ratio of transmitting the data for the eMBB service and the data for the URLLC service may be referred to as the superposition power information, and a method for determining superposition power information is as follows.

First, the base station may apply the superposition power information in the eMBB control channel region like the superposition power information in the URLLC data region. Accordingly, the base station may perform the transmission of the data in the control channel region using the superposition power information applied in the data region.

Second, the base station may set the superposition power information in the eMBB control channel region to be different from the superposition power information in the eMBB data region. At this time, the base station may set the power for transmitting the control information for the eMBB service in the eMBB control channel region to be larger than the power for transmitting the data for the eMBB service in the eMBB data region. For example, the ratio of the power for transmitting the data for the eMBB service in the eMBB data region and the power for transmitting the data for the URLLC service may be set to be 0.2:0.8, while the ratio of the power for transmitting the data for the eMBB service in the eMBB control channel region to the power for transmitting the data for the URLLC service may be set to be 0.4:0.6.

Specifically, the base station may use the following method to transmit the superposition power information.

For example, the base station may include the candidate superposition power information, and the candidate superposition power information may be indicated using the index. Accordingly, the base station may select the superposition power information of any one of the candidate superposition power information, and may transmit the selected superposition power information to the terminal by including the index of the selected superposition power information in the control information. For example, the candidate superposition power information may include ¼, ⅙, ⅛, 1/10, and the like. In this case, the candidate superposition power information may mean the ratio of the power for transmitting the eMBB data and the power for transmitting the URLLC control information in the eMBB control channel region. Also, the superposition power information may be indicated using an index such as 00: ¼, 01: ⅙, 10: ⅛, and 11: 1/10. Accordingly, the base station may determine the superposition power information, and may transmit the index corresponding to the superposition power information to the terminal. For example, if 11 is included in the superposition power information, the base station may transmit the URLLC control information using power of 10 times as large as that of the eMBB data.

As another example, the base station may transmit a 1-bit indicator indicating whether the superposition power information in the eMBB control channel region is differently set from the control information in the eMBB data region to be set as the superposition transmit power and transmit the 1-bit indicator to the terminal. The information may be transmitted by being included in the common control information. Accordingly, if the indicator is set to be 1, the base station may transmit data using the superposition power information determined according to the predetermined rules, and the eMBB terminal may identify the superposition power information according to the predetermined rules.

For example, depending on the predetermined rules, if the superposition power information of the eMBB data channel region is y, the superposition power information of the eMBB control channel region may be set to be 2y. Accordingly, if the indicator included in the common control information is set to be 1, the terminal may identify the superposition power information applied to the URLLC control channel region using the rules.

However, in the third method, the base station may set the puncturing information in the eMBB control channel region and the puncturing information in the eMBB data region to be equal.

In this way, the partial puncturing may be performed on the eMBB service even in the eMBB control channel region, such that the performance deterioration of the URLLC service and the increase in the latency speed may be prevented and the transmit power of the eMBB control information in the control channel is set to be higher than that of the data channel, such that the reliability of information transmitted to the eMBB control channel may be maintained at a high level.

Therefore, the terminal may decode the URLLC control information received through the control channel in consideration of the fact that the superposition is generated in the control channel and the superposition power information.

Meanwhile, the superposition transmission related information including the superposition power information, the avoidance indicator, and the avoidance resource information, the control channel related information, the control channel candidate information, and the like may be transmitted through the data region indicated by the control information without being included in the control information.

Meanwhile, in the fourth method, the base station may perform the partial puncturing on the eMBB service even in a superposition region 740 of the eMBB control channel, in order to prevent the performance deterioration of the URLLC service and the increase in the latency speed.

Therefore, like the second method and the third method, in order to notify the terminal that the partial puncturing is performed on the eMBB service is performed even in the eMBB control channel region, the base station may set the superposition indicator to be 1 and transmit the superposition indicator to the terminal.

Alternatively, the base station may not transmit the superposition indicator, and if the puncturing information or the superimposition power information is received, the terminal may recognize that the superposition transmission has been performed. In addition, as described above, the base station may transmit the avoidance indicator indicating whether the data of the URLLC service is superposed in the eMBB control channel. The detailed content thereof is the same as those described above and therefore will be omitted below.

However, in the fourth method, the base station may use both the puncturing information and the superposition power information used in the second method and the third method. Therefore, the base station may transmit both the puncturing information and the superposition power information to the terminal.

Accordingly, the base station may apply the puncturing information and the superposition power information in the eMBB control channel region like the puncturing information and the superposition power information in the eMBB data region. Accordingly, the base station may perform the transmission of the data in the control channel region using the puncturing information and the superposition power information applied in the data region.

Further, the base station may set the puncturing information and the superposition power information in the eMBB control channel region to be different from the superposition power information in the eMBB data region.

Therefore, the base station should determine the puncturing information and the superposition power information that are different from those in the eMBB data region and transmit the determined puncturing information and superposition power information to the terminal. The method for determining, by a base station, puncturing information and superposition power information and transmitting the puncturing information and the superposition power information to a terminal is the same as described above, and may be omitted below.

Meanwhile, the superposition transmission related information including the superposition indicator, the avoidance indicator, the avoidance resource information, the puncturing information, and the superposition power information, the control channel related information, the control channel candidate information, and the like may be transmitted through the data region indicated by the control information without being included in the control information.

Figure 8:
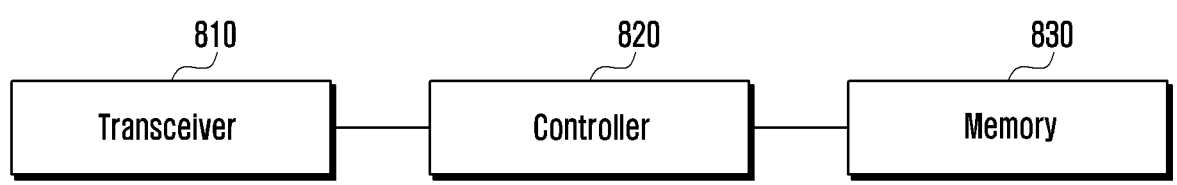
FIG. 8 is a diagram illustrating a structure of a URLLC terminal according to the present disclosure.

FIG. 8 is a diagram illustrating a structure of a URLLC terminal according to the present disclosure.

Referring to FIG. 8, the URLLC terminal may be configured to include a transceiver 810, a controller 820, and a memory (or storage) 830. For example, when defining a controller in the specification, it may be stated that "the controller may be a circuit, an application-specific integrated circuit or at least one processor."

The transceiver 810 may perform communication with other network entities. Further, the transceiver 810 may also receive common control information, URLLC control information, and URLLC data from the base station.

The controller 820 may control a general operation of the URLLC terminal described above. Specifically, the controller 820 may perform a control to receive the common control information through the common control channel and decode the common control information. In addition, the controller 820 may identify whether or not there is data transmitted thereto in the corresponding normal TTI based on the decoding result. If it is determined that there is the data to be transmitted to the controller 820, the controller 820 may identify the location of the URLLC control channel and the superposition transmission related information based on the common control information.

Specifically, the controller 820 may perform a control to receive the control channel candidate information. Further, the controller 820 may identify the TTI in which the URLLC data may be transmitted by using the control channel related information included in the common control information and identify the location of the URLLC control channel in the identified TTI. Alternatively, the controller 820 may identify the location of the URLLC control channel by identifying the start TTI and the number of consecutive RBs. The method for identifying, by a controller 820, a location of a URLLC control channel is the same as those described above, and a detailed description thereof will be omitted.

In addition, the controller 820 may identify the superposition transmission related information (hereinafter referred to as URLLC superposition transmission related information) with the eMBB service in the URLLC control channel by using the common control information. In addition, the controller 820 may identify the location of the eMBB control channel and the superposition transmission related information (hereinafter referred to as eMBB superposition transmission related information) with the URLLC service in the eMBB control channel by using the common control information. The controller 820 uses the avoidance indicator included in the URLLC superposition transmission related information to identify whether or not the base station transmits the eMBB data while the eMBB data superposing the URLLC control channel or transmits the eMBB data at the location where the eMBB is shifted by the predetermined RB in the URLLC control channel. In addition, the controller 820 may identify the puncturing information or the superposition power information included in the URLLC superposition transmission related information. The method for identifying puncturing information and superposition power information are the same as those described above, and a detailed description thereof will be omitted.

The controller 820 may decode the URLLC control information using the identified location of the URLLC control channel and the superposition transmission related information. In addition, the controller 820 may identify the URLLC parameters necessary for decoding the URLLC data as the decoding result. For example, the URLLC parameter may include at least one of resource assignment information of the URLLC data channel, the MCS information, and the superposition scheme with the eMBB service.

Accordingly, the controller 820 may decode the URLLC data using the identified URLLC parameters. At this time, the controller 820 may apply the blind detection scheme to the interference signal related parameters.

The memory 830 may store information transmitted and received to and from the controller 820. The memory 830 may store the control channel candidate information received from the base station. In addition, the memory 830 may store the superposition transmission related information and the control channel related information received from the base station.

Figure 9:
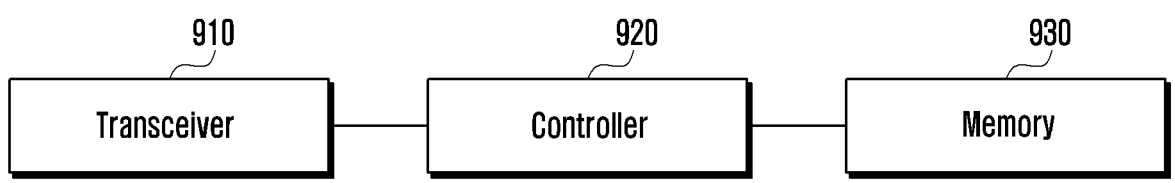
FIG. 9 is a diagram illustrating a structure of the eMBB terminal according to the present disclosure.

FIG. 9 is a diagram illustrating a structure of the eMBB terminal according to the present disclosure.

Referring to FIG. 9, the eMBB terminal may be configured to include a transceiver 910, a controller 920, and a memory 930. For example, when defining a controller in the specification, it may be stated that "the controller may be a circuit, an application-specific integrated circuit or at least one processor."

The transceiver 910 may perform communication with other network entities. Further, the transceiver 910 may also receive common control information, eMBB control information, and eMBB data from the base station.

The controller 920 may control a general operation of the eMBB terminal described above. Specifically, the controller 920 may perform a control to receive the common control information through the common control channel and decode the common control information. In addition, the controller 920 may identify whether or not there is data transmitted thereto in the corresponding normal TTI based on the decoding result. If it is determined that there is the data to be transmitted to the controller 920, the controller 920 may identify the location of the eMBB control channel and the superposition transmission related information based on the common control information.

Specifically, the controller 920 may perform a control to receive the control channel candidate information. Also, the controller 920 may identify the location of the eMBB control channel using the control channel related information included in the common control information. The method for identifying, by a controller 920, a location of a URLLC control channel is the same as those described above, and a detailed description thereof will be omitted.

Further, the controller 920 may identify the eMBB superposition transmission related information using the common control information. Further, the controller 920 may identify the URLLC superposition transmission related information using the common control information. The controller 920 uses the avoidance indicator included in the eMBB superposition transmission related information to identify whether or not the base station transmits the URLLC data while the URLLC data superposing the eMBB control channel or transmits the URLLC data at the location where the eMBB is shifted by the predetermined RB in the eMBB control channel.

In addition, the controller 920 may identify the puncturing information or the superposition power information included in the eMBB superposition transmission related information. The method for identifying puncturing information and superposition power information are the same as those described above, and a detailed description thereof will be omitted.

The controller 920 may decode the eMBB control information using the identified location of the eMBB control channel and the superposition transmission related information. In addition, the controller 920 may identify the eMBB parameters necessary for decoding the eMBB data as the decoding result. For example, the eMBB parameter may include at least one of resource assignment information of the eMBB data channel, the MCS information, and the superposition scheme with the eMBB service.

Accordingly, the controller 920 may decode the eMBB data using the identified eMBB parameters. At this time, the controller 920 may apply the blind detection scheme to the interference signal related parameters.

The memory 930 may store information transmitted and received to and from the controller 920. The memory 930 may store the control channel candidate information received from the base station. In addition, the memory 930 may store the superposition transmission related information and the control channel related information received from the base station.

Figure 10:
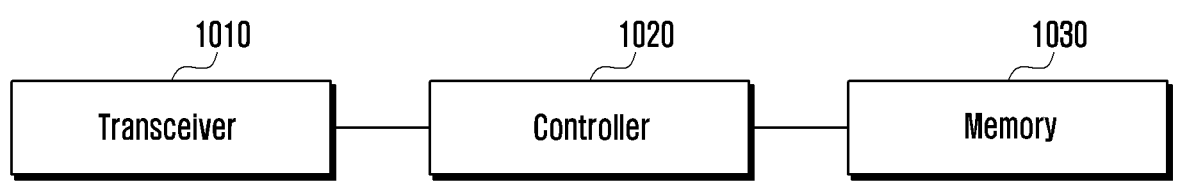
FIG. 10 is a diagram illustrating a structure of a base station according to the present disclosure.

FIG. 10 is a diagram illustrating a structure of a base station according to the present disclosure.

Referring to FIG. 10, the base station may be configured to include a transceiver 1010, a controller 1020, and a memory 1030. For example, when defining a controller in the specification, it may be stated that "the controller may be a circuit, an application-specific integrated circuit or at least one processor."

The transceiver 1010 may perform communication with other network entities. The transceiver 1010 may perform communication with the first terminal and the second terminal. In addition, the transceiver 1010 may transmit the common control information to the terminal through the common control channel, and may transmit the control information for each terminal through the control channels of each terminal. In addition, the transceiver 1010 may transmit data of each terminal through the data channels of each terminal.

The controller 1020 may control a general operation of the base station described above. Specifically, the controller 1020 may determine the location of the control channel for the first terminal and the location of the control channel for the second terminal. The controller 1020 may include the control channel candidate information for the first service and the control channel candidate information for the second service. Accordingly, the controller 1020 may identify resources assigned to provide the second service and determine the location of the control channel of the first service where the region superposed with the resources of the second service is minimized. Similarly, the controller 1020 may identify resources assigned to provide the first service and determine the location of the control channel of the second service where the region superposed with the resources of the first service is minimized.

Further, the controller 1020 may determine the superposition transmission related information. The superposition transmission related information may include the superposition related information (hereinafter, first superposition transmission related information) for the first service and the superposition related information (hereinafter, second superposition transmission related information) for the second service. The first superposition transmission related information and the second superposition transmission related information may each include at least one of the URLLC superposition transmission related information and the eMBB superposition transmission related information.

The first superposition transmission related information may include at least one of the superposition indicator indicating whether or not to perform the superposition transmission with the data of the second service in the control channel of the first service, the avoidance indicator indicating whether or not to shift and transmit the data of the second service in the control channel of the first service, the avoidance resource information, the puncturing information when the superposition transmission is performed, and the superposition power information.

Similarly, the second superposition transmission related information may include at least one of the superposition indicator indicating whether or not to perform the superposition transmission with the data of the first service in the control channel of the second service, the avoidance indicator indicating whether or not to shift and transmit the data of the second service in the control channel of the first service, the avoidance resource information, the puncturing information when the superposition transmission is performed, and the superposition power information.

In addition, the controller 1020 may generate the common control information including the control channel candidate information, the control channel related information indicating the location of the control channel, and the superposition transmission related information, and may transmit the common control information through the common control channel. However, the control channel candidate information may be transmitted to the terminal by being included in the control information every predetermined period without being transmitted every time. Alternatively, the control channel candidate information may be transmitted in advance to the terminal through upper layer signaling (e.g., radio resource control (RRC) signaling). Alternatively, the control channel candidate information may also be transmitted to the terminal by being included in control channel related information.

Further, the controller 1020 generates the control information for transmitting the data for the first terminal and the control information for transmitting the data for the second terminal, and may transmit the control information through the control channels of each terminal. The control information may include a location of a resource to which data is transmitted to the first terminal, the MCS information, and the like.

Further, the controller 1020 may transmit the data for the first terminal and the data for the second terminal through the data channels of each terminal.

In addition, the memory 1030 may store the control channel candidate information, the control channel related information indicating a location of the control channel, and the superposition transmission related information that are generated by the base station.

Meanwhile, although the exemplary embodiments of the present disclosure have been illustrated in the present specification and the accompanying drawings and specific terms have been used, they are used in a general meaning in order to assist in the understanding the present disclosure and do not limit the scope of the present disclosure. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating by a first terminal, the method comprising:

receiving, from a base station, configuration information including information on control channel candidates for the first terminal via higher layer signaling;

receiving, from the base station, common control information for the first terminal and a second terminal including information indicating a control channel among the control channel candidates and overlap information, wherein the overlap information includes information on overlap resources in the control channel, a ratio of the overlap resources to resources in which data for the second terminal is punctured in the overlap resources, and a puncturing indication indicating whether to puncture the data for the second terminal in the overlap resources;

identifying the control channel based on the information on the control channel candidates and the information indicating the control channel among the control channel candidates;

decoding control information received on the control channel based on the information on the overlap resources, the ratio of the overlap resources to the resources in which the data for the second terminal is punctured in the overlap resources, and the puncturing indication; and receiving, from the base station, data for the first terminal based on the control information, wherein the second terminal is different from the first terminal.

2. The method of claim 1, wherein the first terminal receives a first service using a first transmission time interval (TTI), and wherein the second terminal receives a second service using a second TTI.

3. The method of claim 2, wherein the control information includes at least one of modulation coding scheme (MCS) information or resource allocation information.

4. The method of claim 3, wherein the overlap information further includes a power ratio of the control information to the data for the second terminal.

5. The method of claim 1, wherein the overlap information further includes an indicator indicating whether to transmit the data for the second terminal in a resource shifted by a predetermined number of resource blocks from the overlap resources.

6. A method for operating by a base station, the method comprising:

transmitting, to a first terminal, configuration information including information on control channel candidates for the first terminal via higher layer signaling;

identifying a control channel based on the information on the control channel candidates;

identifying overlap information including information on overlap resources in the control channel, a ratio of the overlap resources to resources in which data for a second terminal is punctured in the overlap resources, and a puncturing indication indicating whether to puncture the data for the second terminal in the overlap resources;

transmitting, to the first terminal, common control information for the first terminal and the second terminal including information indicating the control channel and the overlap information;

transmitting, to the first terminal, control information for the first terminal on the control channel based on the information on the overlap resources, the ratio of the overlap resources to the resources in which data for the second terminal is punctured in the overlap resources, and the puncturing indication; and transmitting, to the first terminal, data for the first terminal based on the control information, wherein the second terminal is different from the first terminal.

7. The method of claim 6, wherein the first terminal receives a first service using a first transmission time interval (TTI), and wherein the second terminal receives a second service using a second TTI.

8. The method of claim 7, wherein the control information further includes at least one of modulation coding scheme (MCS) information or resource allocation information.

9. The method of claim 8, wherein the overlap information includes a power ratio of the control information to the data for the second terminal.

10. The method of claim 6, wherein the overlap information further includes an indicator indicating whether to transmit the data for the second terminal in a resource shifted by a predetermined number of resource blocks from the overlap resources.

11. A first terminal comprising:

a transceiver; and a controller coupled with the transceiver and configured to:

receive, from a base station, configuration information including information on control channel candidates for the first terminal via higher layer signaling, receive, from the base station, common control information for the first terminal and a second terminal including information indicating a control channel among the control channel candidates and overlap information, wherein the overlap information includes information on overlap resources in the control channel, a ratio of the overlap resources to resources in which data for the second terminal is punctured in the overlap resources, and a puncturing indication indicating whether to puncture the data for the second terminal in the overlap resources, identify the control channel based on the information on the control channel candidates and the information indicating the control channel among the control channel candidates, decode control information received on the control channel based on the information on the overlap resources, the ratio of the overlap resources to the resources in which the data for the second terminal is punctured in the overlap resources, and the puncturing indication, and receive, from the base station, data for the first terminal based on the control information, wherein the second terminal is different from the first terminal.

12. The first terminal of claim 11, wherein the first terminal receives a first service using a first transmission time interval (TTI), and wherein the second terminal receives a second service using a second TTI.

13. The first terminal of claim 12, wherein the control information includes at least one of modulation coding scheme (MCS) information or resource allocation information.

14. The first terminal of claim 13, wherein the overlap information further includes a power ratio of the control information to the data for the second terminal.

15. The first terminal of claim 11, wherein the overlap information further includes an indicator indicating whether to transmit the data for the second terminal in a resource shifted by a predetermined number of resource blocks from the overlap resources.

16. A base station comprising:

a transceiver; and a controller coupled with the transceiver and configured to:

transmit, to a first terminal, configuration information including information on control channel candidates for the first terminal via higher layer signaling, identify a control channel based on the information on the control channel candidates, identify overlap information including information on overlap resources in the control channel, a ratio of the overlap resources to resources in which data for a second terminal is punctured in the overlap resources, and a puncturing indication indicating whether to puncture the data for the second terminal in the overlap resources, transmit, to the first terminal, common control information for the first terminal and the second terminal including information indicating the control channel and the overlap information, transmit, to the first terminal, control information for the first terminal on the control channel based on the information on the overlap resources, the ratio of the overlap resources to the resources in which data for the second terminal is punctured in the overlap resources, and the puncturing indication, and transmit, to the first terminal, data for the first terminal based on the control information, wherein the second terminal is different from the first terminal.

17. The base station of claim 16, wherein the first terminal receives a first service using a first transmission time interval (TTI), and wherein the second terminal receives a second service using a second TTI.

18. The base station of claim 17, wherein the control information includes at least one of modulation coding scheme (MCS) information or resource allocation information.

19. The base station of claim 18, wherein the overlap information further includes a power ratio of the control information to the data for the second terminal.

20. The base station of claim 16, wherein the overlap information further includes an indicator indicating whether to transmit the data for the second terminal in a resource shifted by a predetermined number of resource blocks from the overlap resources.

* * * * *